United States Patent
Medina et al.

(10) Patent No.: US 10,373,116 B2
(45) Date of Patent: Aug. 6, 2019

(54) INTELLIGENT INVENTORY MANAGEMENT AND RELATED SYSTEMS AND METHODS

(71) Applicant: Fellow, Inc., Burlingame, CA (US)

(72) Inventors: Marco Octavio Mascorro Medina, Burlingame, CA (US); Thavidu Ranatunga, Burlingame, CA (US); Utkarsh Sinha, Burlingame, CA (US); Sivapriya Kaza, Burlingame (CA); Jason Hoang, Burlingame, CA (US); Jagadish Mahendran, Burlingame, CA (US); Christopher Yang, Burlingame, CA (US); Zhengqin Fan, Burlingame, CA (US)

(73) Assignee: FELLOW, INC., Burlingame, CA (US)

( * ) Notice: Subject to any disclaimer, the term of this patent is extended or adjusted under 35 U.S.C. 154(b) by 0 days.

(21) Appl. No.: 16/138,758

(22) Filed: Sep. 21, 2018

(65) Prior Publication Data

US 2019/0087772 A1    Mar. 21, 2019

Related U.S. Application Data

(63) Continuation-in-part of application No. 15/369,812, filed on Dec. 5, 2016, which is a continuation of
(Continued)

(51) Int. Cl.
*G06Q 10/08*       (2012.01)
*B64C 39/02*       (2006.01)
(Continued)

(52) U.S. Cl.
CPC .......... *G06Q 10/087* (2013.01); *B25J 9/1697* (2013.01); *B64C 39/024* (2013.01);
(Continued)

(58) Field of Classification Search
CPC ......... G06Q 10/087; G05D 2201/0216; G05D 2201/0206; G05D 2201/0211;
(Continued)

(56) References Cited

U.S. PATENT DOCUMENTS

| 4,354,252 A | 10/1982 | Lamb et al. ............. 340/502 |
| 4,638,445 A | 1/1987 | Mattaboni .................. 701/23 |

(Continued)

FOREIGN PATENT DOCUMENTS

| JP | H11328266 | 11/1999 | ............. G06F 15/00 |
| JP | 2003016351 | 1/2003 | ............. G01C 21/00 |

(Continued)

OTHER PUBLICATIONS

Advisory Action issued in co-pending related U.S. Appl. No. 13/586,732, dated Dec. 23, 2015 (4 pages).
(Continued)

*Primary Examiner* — Spencer D Patton
(74) *Attorney, Agent, or Firm* — Hayes Soloway P.C.

(57) ABSTRACT

An intelligent system for performing inventory management within a facility includes at least one imaging sensor, a transmitter for sending inventory information to a database, a receiver for receiving information from a database, and a computer in communication with the locomotion platform, at least one imaging sensor, the transmitter, and the receiver. The computer is configured to capture inventory images from the at least one imaging sensor, detect inventory by comparing captured inventory images with stored inventory images, determine inventory information, determine a confidence level for the inventory information, and communicate at least a portion of the inventory information to the database. In one embodiment, the system includes a robot having a locomotion platform, the at least one imaging sensor, the transmitter, the receiver, and the computer.

20 Claims, 25 Drawing Sheets

Related U.S. Application Data application No. 14/921,899, filed on Oct. 23, 2015, now Pat. No. 9,796,093.

(60) Provisional application No. 62/068,474, filed on Oct. 24, 2014, provisional application No. 62/622,000, filed on Jan. 25, 2018, provisional application No. 62/561,588, filed on Sep. 21, 2017.

(51) Int. Cl.
    *G05D 1/02* (2006.01)
    *G05D 1/10* (2006.01)
    *B25J 9/16* (2006.01)
    *G06Q 30/00* (2012.01)

(52) U.S. Cl.
    CPC ........... *G05D 1/0246* (2013.01); *G05D 1/101* (2013.01); *G06Q 30/016* (2013.01); *B64C 2201/127* (2013.01); *B64C 2201/141* (2013.01); *Y10S 901/01* (2013.01); *Y10S 901/47* (2013.01)

(58) Field of Classification Search
    CPC  Y10S 901/01; B25J 9/1697; B64C 2201/127; B64C 2201/141
    See application file for complete search history.

(56) References Cited

U.S. PATENT DOCUMENTS

| | | | |
|---|---|---|---|
| 4,890,241 A | 12/1989 | Hoffman et al. | 700/255 |
| 4,939,728 A | 7/1990 | Markkula et al. | 370/419 |
| 5,293,639 A | 3/1994 | Wilson et al. | 455/17 |
| 6,292,713 B1 | 9/2001 | Jouppi et al. | 700/245 |
| 6,347,261 B1 | 2/2002 | Sakaue et al. | 700/245 |
| 7,461,156 B2 | 12/2008 | Haupt et al. | 709/228 |
| 7,609,686 B1 | 10/2009 | McNamara et al. | 370/356 |
| 7,693,757 B2 | 4/2010 | Zimmerman | G06Q 10/00 |
| 7,702,739 B1 | 4/2010 | Cheng et al. | 709/207 |
| 7,801,959 B1 | 9/2010 | Lennie et al. | 709/206 |
| 7,827,459 B1 | 11/2010 | Zhou et al. | 714/749 |
| 8,046,744 B1 | 10/2011 | Marshall et al. | 717/128 |
| 8,050,684 B2 | 11/2011 | Lewis et al. | 455/445 |
| 8,407,306 B1 | 3/2013 | Nerieri et al. | 709/206 |
| 8,594,845 B1 | 11/2013 | Gharpure | 700/253 |
| 8,619,799 B1 | 12/2013 | Thodupunoori et al. | 370/401 |
| 8,700,722 B1 | 4/2014 | Sharma et al. | 709/206 |
| 8,965,762 B2 | 2/2015 | Song et al. | 704/236 |
| 9,191,619 B2 | 11/2015 | Liu | H04N 7/157 |
| 9,205,886 B1* | 12/2015 | Hickman | G05D 1/0246 |
| 9,767,432 B1 | 9/2017 | Brazeau et al. | G06Q 10/087 |
| 2002/0071427 A1 | 6/2002 | Schneider et al. | 370/352 |
| 2002/0160805 A1 | 10/2002 | Laitinen et al. | 455/550 |
| 2002/0165790 A1 | 11/2002 | Bancroft et al. | 705/26 |
| 2004/0164696 A1 | 8/2004 | Yourlo et al. | 318/568.11 |
| 2006/0047665 A1 | 3/2006 | Neil | 707/10 |
| 2006/0071929 A1 | 4/2006 | Stinis et al. | 345/213 |
| 2006/0105792 A1 | 5/2006 | Armbruster et al. | 455/517 |
| 2006/0106471 A1 | 5/2006 | Ikeda et al. | 700/83 |
| 2006/0178559 A1 | 8/2006 | Kumar et al. | 600/109 |
| 2006/0190526 A1 | 8/2006 | Neil et al. | 709/203 |
| 2006/0258287 A1 | 11/2006 | Bidet et al. | 455/41.2 |
| 2007/0069014 A1 | 3/2007 | Heckel et al. | 235/383 |
| 2007/0100951 A1 | 5/2007 | Bae | 709/206 |
| 2007/0123307 A1 | 5/2007 | Adams et al. | 455/566 |
| 2007/0130255 A1 | 6/2007 | Wolovitz et al. | 709/204 |
| 2007/0156817 A1 | 7/2007 | Daffner et al. | 709/206 |
| 2007/0162582 A1 | 7/2007 | Belali et al. | 709/223 |
| 2007/0299918 A1 | 12/2007 | Roberts | 709/206 |
| 2008/0039974 A1* | 2/2008 | Sandin | G05D 1/0225 700/258 |
| 2008/0077511 A1 | 3/2008 | Zimmerman | 705/28 |
| 2008/0080370 A1 | 4/2008 | Willey | 370/229 |
| 2008/0109519 A1 | 5/2008 | Aaltonen et al. | 709/206 |
| 2008/0140789 A1 | 6/2008 | Mulligan et al. | 709/206 |
| 2008/0244040 A1 | 10/2008 | Bhatia et al. | 709/219 |
| 2008/0305775 A1 | 12/2008 | Aaltonen et al. | 455/412.1 |
| 2009/0047929 A1 | 2/2009 | Chesnutt et al. | 455/411 |
| 2009/0055019 A1 | 2/2009 | Stiehl | B25J 9/1671 |
| 2009/0149992 A1 | 6/2009 | Ohno | 700/253 |
| 2009/0163244 A1 | 6/2009 | Parkkinen et al. | 455/558 |
| 2009/0209250 A1 | 8/2009 | Huq | 455/425 |
| 2009/0281880 A1 | 11/2009 | Lee | 705/11 |
| 2010/0070588 A1 | 3/2010 | Sinn et al. | 709/206 |
| 2010/0094461 A1 | 4/2010 | Roth et al. | 700/251 |
| 2010/0094985 A1 | 4/2010 | Abu-Samaha et al. | 709/223 |
| 2010/0131103 A1 | 5/2010 | Herzog et al. | 700/259 |
| 2010/0150171 A1 | 6/2010 | Rodbro et al. | 370/468 |
| 2010/0238262 A1 | 9/2010 | Kurtz | H04N 7/142 |
| 2010/0245532 A1 | 9/2010 | Kurtz | G06K 9/00711 |
| 2010/0314226 A1 | 12/2010 | Patel et al. | 200/237 |
| 2011/0071676 A1 | 3/2011 | Sanders et al. | 700/250 |
| 2011/0087571 A1 | 4/2011 | Sagi et al. | 705/34 |
| 2011/0125856 A1 | 5/2011 | Chu et al. | 709/206 |
| 2011/0158476 A1 | 6/2011 | Fahn et al. | 382/103 |
| 2011/0173621 A1 | 7/2011 | Meijer et al. | 718/102 |
| 2011/0213657 A1 | 9/2011 | O'Malley et al. | 705/14.49 |
| 2011/0225578 A1 | 9/2011 | Lauwers et al. | 717/176 |
| 2011/0231050 A1 | 9/2011 | Goulding | 701/26 |
| 2011/0238211 A1 | 9/2011 | Shirado et al. | 700/246 |
| 2011/0288684 A1 | 11/2011 | Farlow et al. | 700/264 |
| 2011/0307403 A1 | 12/2011 | Rostampour et al. | 705/325 |
| 2012/0033605 A1 | 2/2012 | Yang et al. | 370/312 |
| 2012/0042028 A1 | 2/2012 | Langoulant et al. | 709/206 |
| 2012/0069131 A1 | 3/2012 | Abelow | 348/14.01 |
| 2012/0122425 A1 | 5/2012 | Adams et al. | 455/412.1 |
| 2012/0185547 A1 | 7/2012 | Hugg et al. | 709/206 |
| 2012/0239196 A1 | 9/2012 | Olivier | B25J 9/1689 |
| 2012/0284397 A1 | 11/2012 | Cheng | 709/224 |
| 2012/0303774 A1 | 11/2012 | Wilson et al. | 709/223 |
| 2012/0311046 A1 | 12/2012 | Grigoriev | 709/206 |
| 2012/0315879 A1 | 12/2012 | Vrbaski et al. | 455/412.1 |
| 2013/0007299 A1 | 1/2013 | German et al. | 709/237 |
| 2013/0047034 A1 | 2/2013 | Salomon et al. | 714/18 |
| 2013/0050743 A1 | 2/2013 | Steely et al. | 358/1.15 |
| 2013/0111572 A1 | 5/2013 | Gaddam et al. | 726/7 |
| 2013/0120547 A1 | 5/2013 | Linnell | 348/61 |
| 2013/0151007 A1* | 6/2013 | Valpola | B25J 9/1694 700/245 |
| 2013/0173727 A1 | 7/2013 | Libin et al. | 709/206 |
| 2013/0179514 A1 | 7/2013 | Arora et al. | 709/206 |
| 2013/0212203 A1 | 8/2013 | Park et al. | 709/206 |
| 2013/0231779 A1 | 9/2013 | Purkayastha et al. | 700/259 |
| 2014/0009561 A1 | 1/2014 | Sutherland et al. | 348/14.05 |
| 2014/0009612 A1* | 1/2014 | King | B66F 9/0755 348/143 |
| 2014/0095216 A1 | 4/2014 | Radhakrishnan | 705/5 |
| 2014/0184423 A1 | 7/2014 | Mensinger et al. | 340/870.09 |
| 2014/0270115 A1 | 9/2014 | Burnett et al. | 379/88.12 |
| 2014/0304238 A1 | 10/2014 | Halla-Aho et al. | 707/692 |
| 2014/0344118 A1 | 11/2014 | Parpia et al. | G06Q 10/087 |
| 2015/0052029 A1 | 2/2015 | Wu et al. | G06Q 10/087 |
| 2015/0246654 A1 | 9/2015 | Tadic | B60W 40/09 |
| 2016/0114488 A1 | 4/2016 | Mascorro Medina et al. B25J 9/1697 |
| 2016/0132707 A1 | 5/2016 | Lindbo et al. | G06K 7/1413 |
| 2016/0247116 A1 | 8/2016 | Olivo et al. | G06Q 10/087 |
| 2016/0325934 A1 | 11/2016 | Stiernagle et al. | B65G 1/1373 |
| 2017/0337508 A1* | 11/2017 | Bogolea | G05D 1/0274 |
| 2018/0164213 A1* | 6/2018 | Windorfer | G01N 21/251 |
| 2018/0370628 A1* | 12/2018 | Ljubuncic | B64C 39/024 |

FOREIGN PATENT DOCUMENTS

| | | | |
|---|---|---|---|
| JP | 2005172879 | 6/2005 | B25J 13/00 |
| JP | 2006323708 | 11/2006 | G06Q 30/02 |
| JP | 2007190641 | 8/2007 | A63H 3/33 |

(56) References Cited

FOREIGN PATENT DOCUMENTS

| JP | 2008055578 | 3/2008 | ............... A63H 3/33 |
|---|---|---|---|
| JP | 2011128790 | 6/2011 | ............. G06F 17/30 |

OTHER PUBLICATIONS

Broccia et al., "Gestural Interaction for Robot Motion Control," Eurographics Italian Chapter Conference, 2011, (8 pgs).
Campbell et al., "The Message Session Relay Protocol (MSRP)", RFC 4975, 2007 (64 pgs).
Campbell et al., "The Message Session Relay Protocol", 2005 (58 pgs).
European Search Report issued in application No. 15852996.6, dated Mar. 16, 2018 (7 pgs).
International Preliminary Report on Patentability issued in application No. PCT/US2015/057392, dated May 4, 2017 (8 pgs).
International Search Report and Written Opinion from related PCT International Patent Application Serial No. PCT/US2017/064753, dated Feb. 6, 2018 (10 pgs).
International Search Report and Written Opinion issued in application No. PCT/US15/57392, dated Jan. 12, 2016 (10 pgs).
Japanese Office Action (w/translation) issued in application No. 2017-522057, dated Jun. 25, 2018 (9 pgs).
Libin et al., Provisional U.S. Appl. No. 61/580,907, filed Dec. 28, 2011 (4 pgs).
Lixia Zhang, *VirtualClock:A New Traffic Control Algorithm for Packet Switching Networks*, ACM SIGCOMM Computer Communication Review, 1990, pp. 19-29.
Notice of Allowance issued in U.S. Appl. No. 13/586,732, dated Dec. 8, 2016 (22 pgs).
Notice of Allowance issued in U.S. Appl. No. 13/896,162 , dated Jul. 31, 2015 (33 pgs).
Notice of Allowance issued in U.S. Appl. No. 14/921,899, dated Aug. 31, 2017 (14 pgs).
Office Action issued in U.S. Appl. No. 13/586,732, dated Jun. 6, 2014 (24 pgs).
Office Action issued in U.S. Appl. No. 13/586,732, dated Mar. 20, 2015 (26 pgs).
Office Action issued in U.S. Appl. No. 13/586,732, dated Sep. 30, 2015 (23 pgs).
Office Action issued in U.S. Appl. No. 13/586,732, dated Sep. 2, 2016 (39 pgs).
Office Action issued in U.S. Appl. No. 13/896,162 , dated Jan. 22, 2015 (22 pgs).
Office Action issued in U.S. Appl. No. 14/921,899, dated Jun. 7, 2017 (43 pgs).
Office Action issued in U.S. Appl. No. 15/369,812, dated Aug. 7, 2018 (39 pgs).
Official Action issued in co-pending U.S. Appl. No. 13/586,732, dated Mar. 24, 2016 (32 pages).
Official Action issued in co-pending U.S. Appl. No. 13/586,732, dated Oct. 24, 2014 (20 pages).
Yim et al., Design Considerations of Expressive Bidrectional Telepresence Robots, CHI 2011, May 7-12, 2011 (10 pgs).
International Search Report and Written Opinion issued in application No. PCT/US2018/052279, dated Jan. 22, 2019 (12 pgs).
Japanese Decision to Grant issued in application No. 2017-522057, dated Feb. 13, 2019 (10 pgs).
Office Action issued in U.S. Appl. No. 15/369,812, dated Dec. 12, 2018 (18 pgs).

* cited by examiner

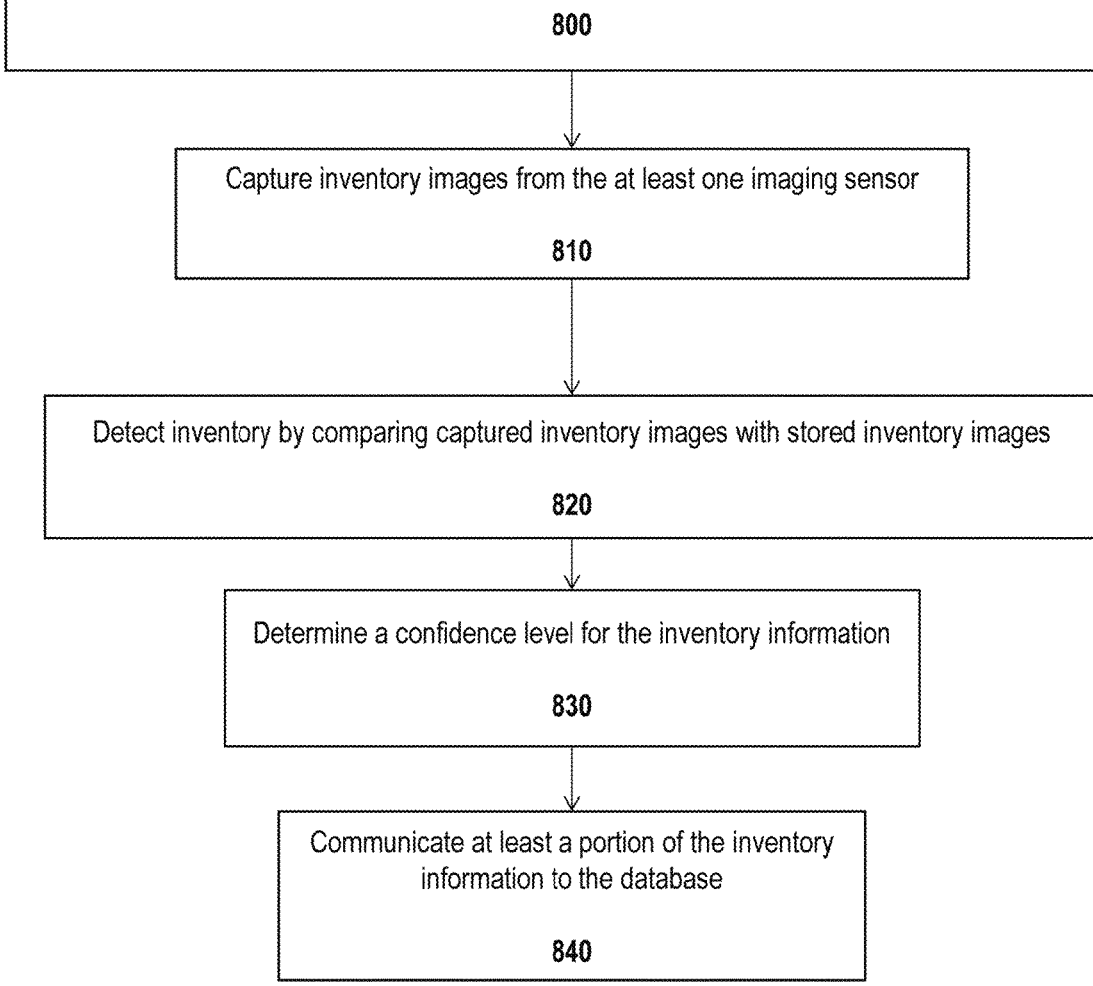

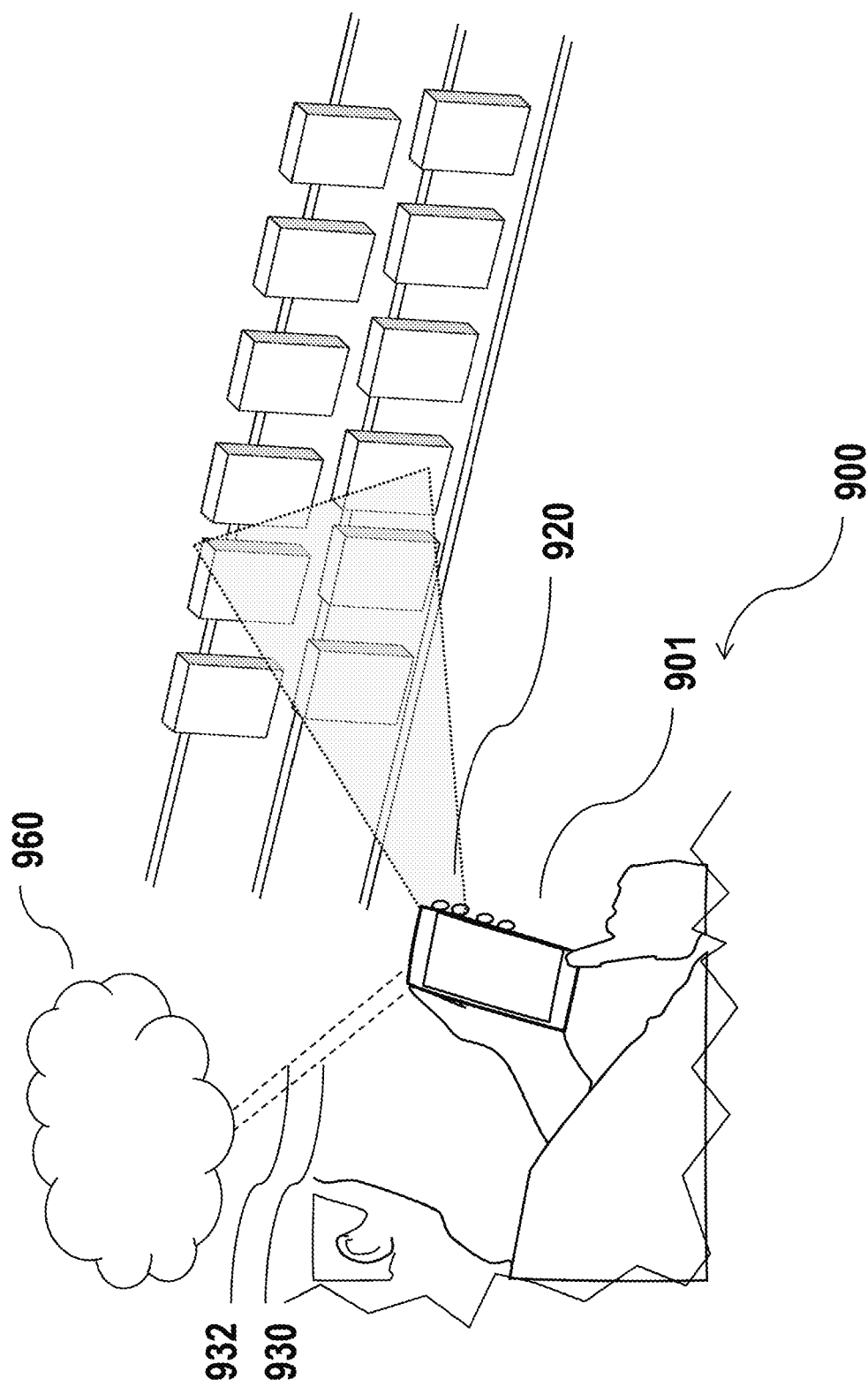

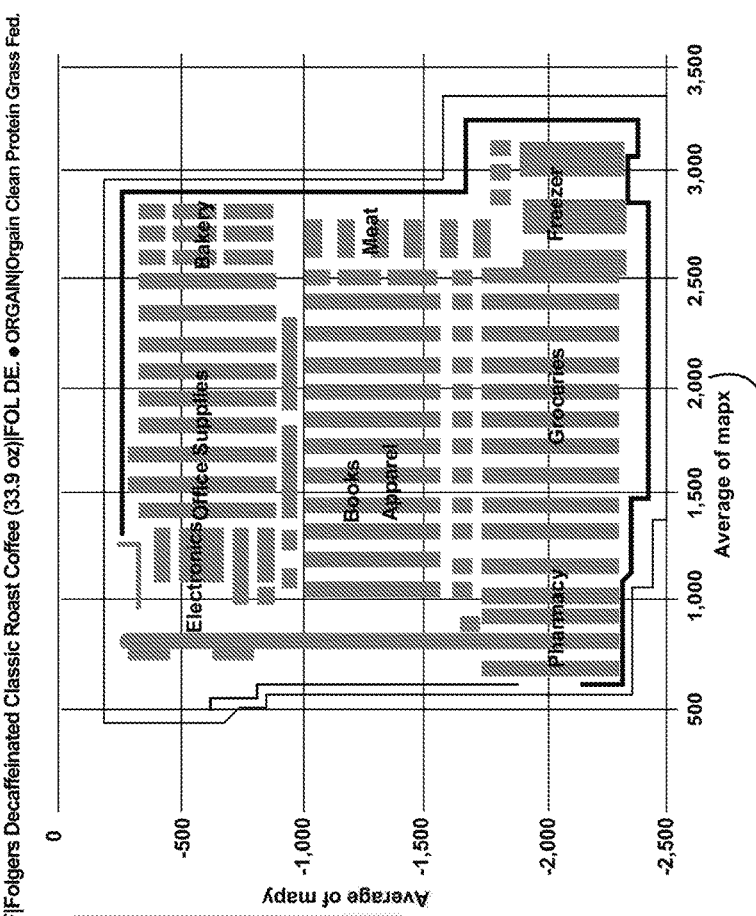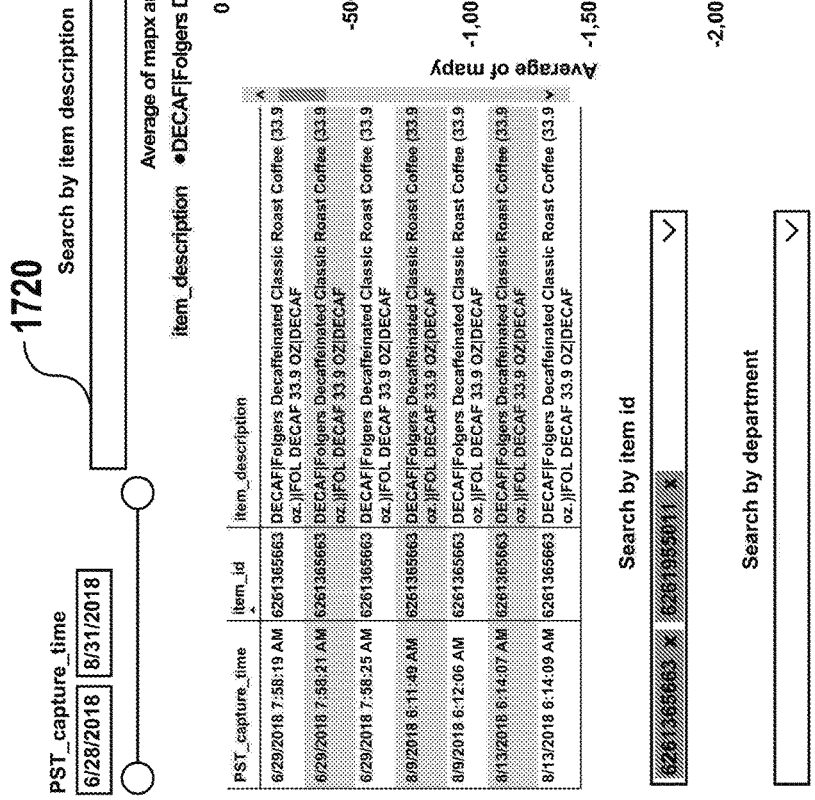
Fig. 17B

| | | | 1810 |
|---|---|---|---|
| All Stores | Empty shelves (%)<br>Known<br>Unknown | # new discrepancies<br>17.60K | SKU value of all empty spots<br>$1.08M | Missing inventory<br>15.59K |
| Retailer #1 | Empty shelves (%)<br>Known<br>Unknown | # new discrepancies<br>4650 | SKU value of all empty spots<br>$269.93K | Missing inventory<br>4.66K |
| Retailer #2 | Empty shelves (%)<br>Known<br>Unknown | # new discrepancies<br>4425 | SKU value of all empty spots<br>$318.00K | Missing inventory<br>3.68K |
| Retailer #3 | Empty shelves (%)<br>Known<br>Unknown | # new discrepancies<br>3009 | SKU value of all empty spots<br>$184.05K | Missing inventory<br>3.19K |

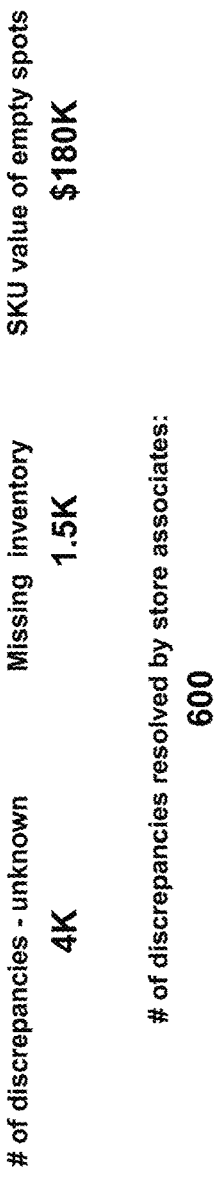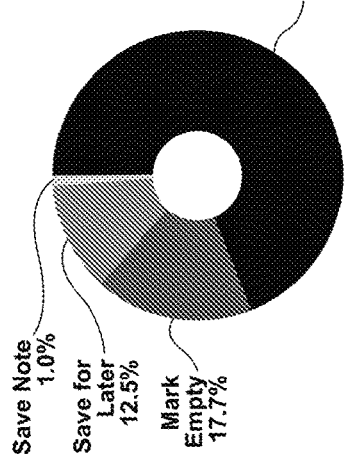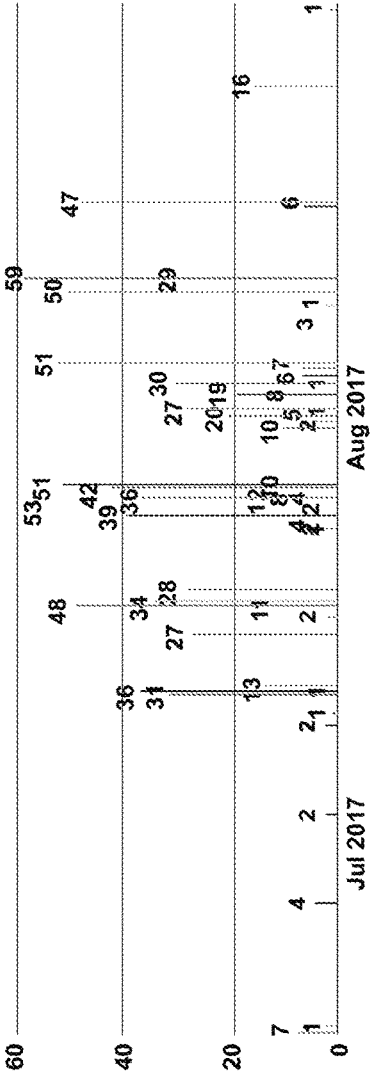
Fig. 20

2100

Order #                                    Confirmation #

Customer ID        Phone #    Email ID

2110

| 1. | Item # | - | Location (Aisle, Bay, Bin) | On-Hand Quantity |
| 2. | Item # | - | Location (Aisle, Bay, Bin) | On-Hand Quantity |
| 3. | Item # | - | Location (Aisle, Bay, Bin) | On-Hand Quantity |
| ..... | | | | |
| ..... | | | | |
| ..... | | | | |
| ..... | | | | |
| n. | Item # | - | Location (Aisle, Bay, Bin) | On-Hand Quantity |

2120

| Available List | Notify Customer / Complete | Not Available List |

INTELLIGENT INVENTORY MANAGEMENT AND RELATED SYSTEMS AND METHODS

CROSS REFERENCE TO RELATED APPLICATION

This application is a continuation-in-part of U.S. patent application Ser. No. 15/369,812 entitled, "Intelligent Service Robot and Related Systems and Methods filed Dec. 5, 2016, which in turn is a continuation-in-part of U.S. patent application Ser. No. 14/921,899 entitled "Customer Service Robot and Related Systems and Methods" filed Oct. 23, 2015, now U.S. Pat. No. 9,796,093, and claims the benefit of U.S. Provisional Application Ser. No. 62/068,474 entitled, "Customer Service Robot and System" filed Oct. 24, 2014, U.S. Provisional Application Ser. No. 62/622,000 entitled, "Intelligent Inventory Management and Related Systems and Methods" filed Jan. 25, 2018, U.S. Provisional Application Ser. No. 62/561,588 entitled, "Intelligent Service Robot and Related Systems" filed Sep. 21, 2017, the entire disclosures of which is incorporated herein by reference.

FIELD OF THE DISCLOSURE

The present disclosure is generally related to inventory management and is more particularly related to intelligent inventory devices, robots, and related systems and methods thereof.

BACKGROUND

For most retail stores and many commercial stores, inventory management is a complex, time-consuming, and expensive issue. Large stores can carry more than 10,000 items on shelves. These items must be tagged, tracked, displayed, restocked, and priced on a regular basis to ensure product availability to customers.

Inventory stocking is the process of placing items out on shelves or in displays such that they can be purchased by customers. Restocking is the process of replenishing items that have been purchased, moved, stolen, or damaged. Stocking and restocking are time-consuming tasks, since they normally entail the detailed review of all products for sale. Traditionally, store employees travel each aisle, noting the number and location of depleted or missing items. They gather new inventory from a backroom storage area, then travel each aisle again, replenishing low stock with new inventory. Depending on the store, this process can take dozens of employees and many hours to complete. Often, restocking must be done after a store has closed or late at night. This can leave shelves understocked for long periods during business hours. Additionally, the process can require additional employees working an overnight shift to complete restocking before the opening of the store the next day.

Another drawback of the conventional inventory process is that it can be difficult to collect accurate loss prevention data. Employees may only realize that items have been stolen when restocking late in the day. This makes it difficult to analyze when theft occurred or tailor loss prevention policies to specific items and areas.

While employees are restocking inventory on shelves, they often must concurrently perform quality assurance checks. Employees ensure that all items are properly located, returning moved and misplaced items to their appropriate areas. Often, this means traveling the entire store in search of misplaced items and subsequently placing the misplaced items in their correct locations. Additionally, employees must also ensure that items are displayed neatly, with price tags and labels visible. Employees also frequently need to make sure that any pricing information displayed is correct. Often, this means checking item prices against periodic or special sales lists and amending incorrect displays. Furthermore, this method of pricing is not dynamic, as it is difficult for retail stores to adjust prices quickly based on supply and demand.

Additionally, many franchise or branch stores are required to stock and display products in a manner determined by a corporate office. Such information is usually displayed in the form of a planogram: a diagram that indicates the placement of products in a shelf and in a store. Planogram compliance can be inaccurate for a number of reasons, including human error in reading the diagram, differences in store layout, inattention to placement details, and changes in product packaging. However, planogram compliance is important to ensure consistency between stores and to present products for sale according to a chosen strategic plan. If stores do not stock and display products accurately, the data upon which corporate offices analyze sales and create strategic placement plans is likely to be inaccurate.

Current solutions to these problems utilize inventory management software, point of sale systems, and tracking devices to manage inventory. However, the implementation of these solutions is largely dependent on data supplied by humans. This data can be inconvenient to collect, time-consuming to gather, and inaccurate.

Thus, a heretofore unaddressed need exists in the industry to address the aforementioned deficiencies and inadequacies.

SUMMARY OF THE DISCLOSURE

Embodiments of the present disclosure provide multiple intelligent improvements in devices, robots, systems, and methods for performing inventory management within a facility.

In one embodiment, a robot for performing inventory management within a facility is provided. The robot includes a locomotion platform, at least one imaging sensor for detecting inventory, a transmitter for sending inventory information to a database, a receiver for receiving inventory information from a database, and a robot computer. The robot computer communicates with the locomotion platform, the at least one imaging sensor, the transmitter, and the receiver, and the robot computer includes a processor and computer-readable memory. The robot computer is configured to capture inventory images from the at least one imaging sensor, detect inventory by comparing captured inventory images with stored inventory images, determine inventory information, determine a confidence level for the inventory information, and communicate at least a portion of the inventory information to the database.

In another embodiment, the present disclosure can also be viewed as providing methods of inventorying a commercial facility with a robot. In this regard, one embodiment of such a method, among others, can be broadly summarized by the following steps: providing a robot within a commercial facility, wherein the robot has a locomotion platform, at least one imaging sensor for detecting inventory, a transmitter for sending inventory information to a database, a receiver for receiving inventory information from a database, and a robot computer in communication with the locomotion platform, the at least one imaging sensor, the transmitter, and the receiver, the robot computer including a processor and computer-readable memory; capturing inventory images from the at least one imaging sensor; detecting inventory by comparing captured inventory images with stored inventory images; determining inventory status; determining a confidence level for the inventory information; and communicating at least a portion of the inventory information to the database.

In another embodiment, the present disclosure can also be viewed as providing a system for performing automated inventory management within a commercial facility. The system includes at least one imaging sensor for detecting inventory, a transmitter for sending inventory information to a database, a receiver for receiving inventory information from a database, and a computer. The computer communicates with the locomotion platform, the at least one imaging sensor, the transmitter, and the receiver, and the computer includes a processor and computer-readable memory. The computer is configured to capture inventory images from the at least one imaging sensor, detect inventory by comparing captured inventory images with stored inventory images, determine inventory information, determine a confidence level for the inventory information, and communicate at least a portion of the inventory information to the database.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 7A-B show exemplary embodiments of additional designs of the inventory management device, in accordance with the present disclosure, of which FIG. 7A shows the inventory management device having a suspended camera system.

FIG. 8 is a flow chart showing a method of inventorying a commercial facility with a robot.

FIG. 9 shows one exemplary embodiment of a system for performing inventory management within a commercial facility.

FIGS. 17A-17B are illustrations of the visual location mapping interface of the system.

FIG. 18 is an illustration of the store manager dashboard interface of the system.

FIG. 20 is an illustration of the associate performance interface of the system.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many aspects of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multiprocessor systems, processor-based or programmable consumer electronics, network computers, minicomputers) and the like.

Some aspects of the invention may also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

Figure 1:
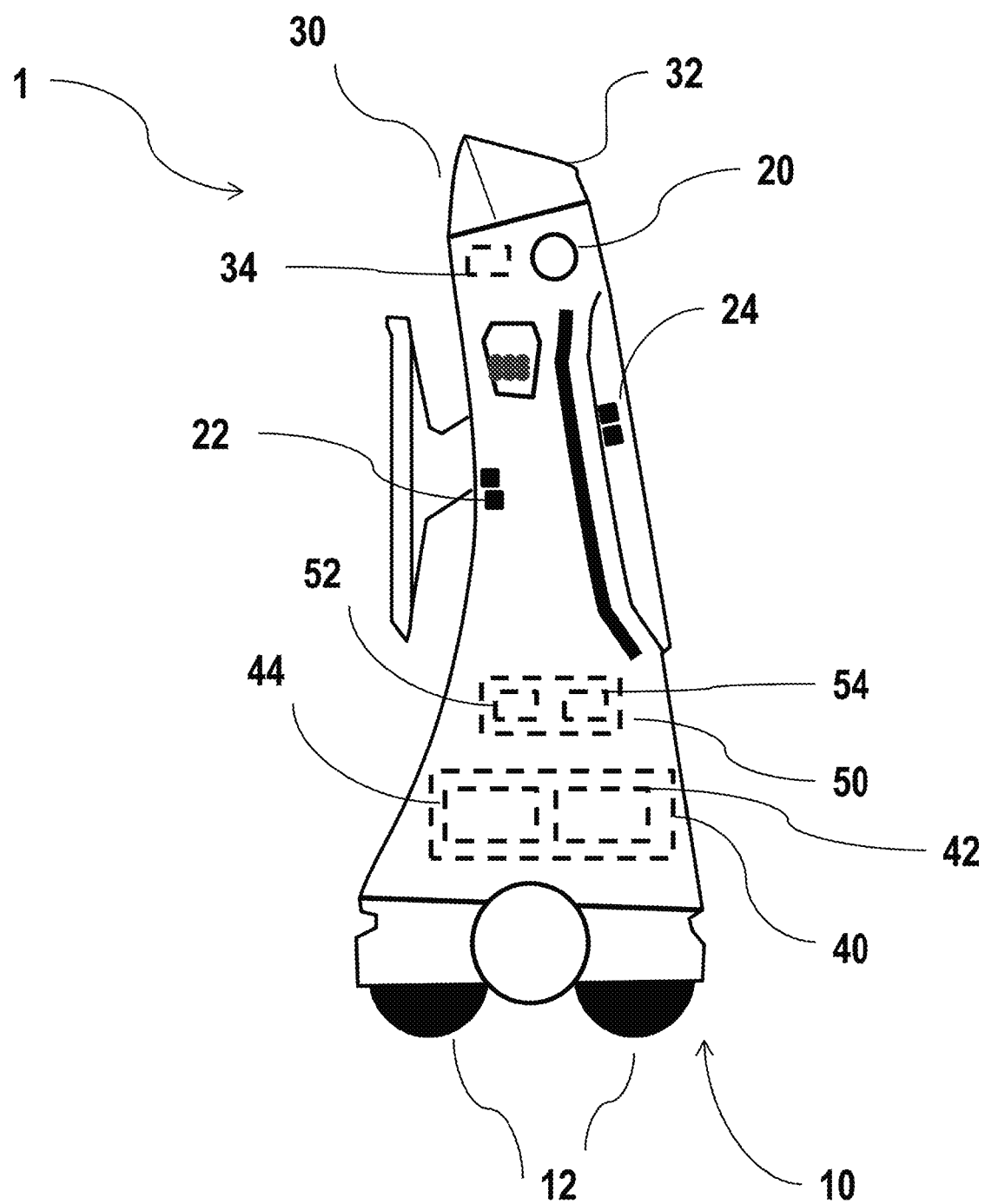
FIG. 1 is a schematic illustration of a robotic device for performing inventory management within a commercial facility, in accordance with a first exemplary embodiment of the disclosure.

FIG. 1 is a schematic illustration of a robotic device for performing inventory management within a commercial facility, in accordance with a first exemplary embodiment of the disclosure. The robotic device 1, (hereinafter "robot") may be any type of robot, telebot, or similar fully or partially robotic device which is capable of autonomously navigating, sensing, or detecting some element and communicating with a remotely located database. The robot 1 may include a locomotion platform 10, at least one imaging sensor 20 for detecting inventory, a transmitter 30 for sending inventory information to a database, a receiver 32 for receiving inventory information from a database, and a robot computer 40. The robot computer 40 may communicate with the locomotion platform 10, the at least one imaging sensor 20, the transmitter 30, and the receiver 32. The robot computer 40 may include a processor 42 and computer-readable memory 44.

The robot computer 40 is configured to capture inventory images from the at least one imaging sensor 20, detect inventory by comparing captured inventory images with stored inventory images, determine inventory status, determine a confidence level for the inventory information, and communicate at least a portion of the inventory information to the database.

The locomotion platform 10 allows the robot 1 to move. The locomotion platform 10 may have, for example, two or more wheels and casters 12, allowing the robot 1 to move in any direction. The robot 1 may include any type of drive system to move using the locomotion platform 10, such as electromechanical drive motors. The robot 1 may have a variety of heights. In one example, the robot 1 may be tall enough to capture an image of the entire height of an aisle, shelf, or other product display system. The height of the robot 1 may be adjustable.

The robot computer 40 can be any computing device constructed from various hardware and software components utilizing any known operating system. In one embodiment, the robot computer 40 is a mini computer that uses Ubuntu operating system and includes a single 12V power supply. The robot computer 40 may have sufficient processing power to run a variety of software, including for example, Robot Operating System (ROS), video processing with OpenCV, and the like. Any computing components known in the art may be used with the robot computer 40.

The robot 1 may further include a power system 50. The power system 50 may include a battery 52 and a charging system 54. The battery 52 may be a rechargeable lead-acid battery, lithium ion battery, or any other type of battery. The charging system 54 may include an interface which allows the robot 1 to electrically couple to a docking station (not shown) for charging. The power system 50 may include power distribution circuitry and components, including regulators, heat dissipation devices, fuses and/or circuit breakers. Furthermore, the power system 50 may include an emergency cut-off circuit which may automatically, or manually, cut power from the robot 1 under certain circumstances, for example if the battery 52 is too hot, if the battery 52 is below a certain minimum threshold charge, or if the robot 1 moves outside of a predefined area. Battery life may vary significantly depending on the operation of the robot 1. In one example, the battery type, size and capacity may allow for a full day of use between charges.

The robot computer 40 may have one or more processor(s) 42 and associated circuitry for the control and imaging of the robot 1. The processor 42 may be, for example, an Arduino Mega microcontroller, which allows for easy development along with serial output for controlling the locomotion platform 10, and may act as a serial (e.g., via USB) device that provides an interface to the robot computer 40. The processor 42 may be any processor, microprocessor or microcontroller, and may be a PIC microcontroller, which is generally powerful and allows for high speed USB and Ethernet connections for data transfer. The processor 42 may include or be associated with some amount of computer-readable memory 44, including RAM, cache memory, hard drives (HDDs), and solid state drives (SSDs).

The robot may include a transmitter 30 and a receiver 32 for sending and receiving information from the database, human operators, or other computer systems. The transmitter 30 and receiver 32 may be any type of communication hardware used for communicating over wireless protocols, for instance, Wi-Fi®, Bluetooth®, NFC®, cellular communications protocols, or any other network arrangement and/or protocol known to those having ordinary skill in the art. In one example, the robot may use a combination of wireless protocols to communicate.

The robot 1 may further include a robot location detector 34. The robot location detector 34 may utilize any of a number of known location detection techniques, including Global Positioning System (GPS), Indoor Positioning System (IPS) and Inertial Navigation System (INS), to detect the location of the robot 1. The robot location detector 34 may also function in coordination with any number of maps, floorplans, or similar schematics of a layout of the facility in which the robot 1 is utilized.

The imaging sensor(s) 20 may be located anywhere on the robot beneficial for capturing images of inventory. In one example, the imaging sensor 20 may be positioned so that it is substantially parallel to items within the field of view while the robot 1 travels along a route. The robot may be equipped with additional imaging sensors 22. The robot 1 may also be equipped with environmental or hazard sensors 24 (hereinafter "other sensors"). The imaging sensor 20, additional imaging sensors 22, and other sensors 24 are discussed in greater detail in FIGS. 3 and 6, below.

Operational Example

In one example, a robot embodiment of the disclosure may be employed in a commercial retail facility such as a store.

Figure 2:
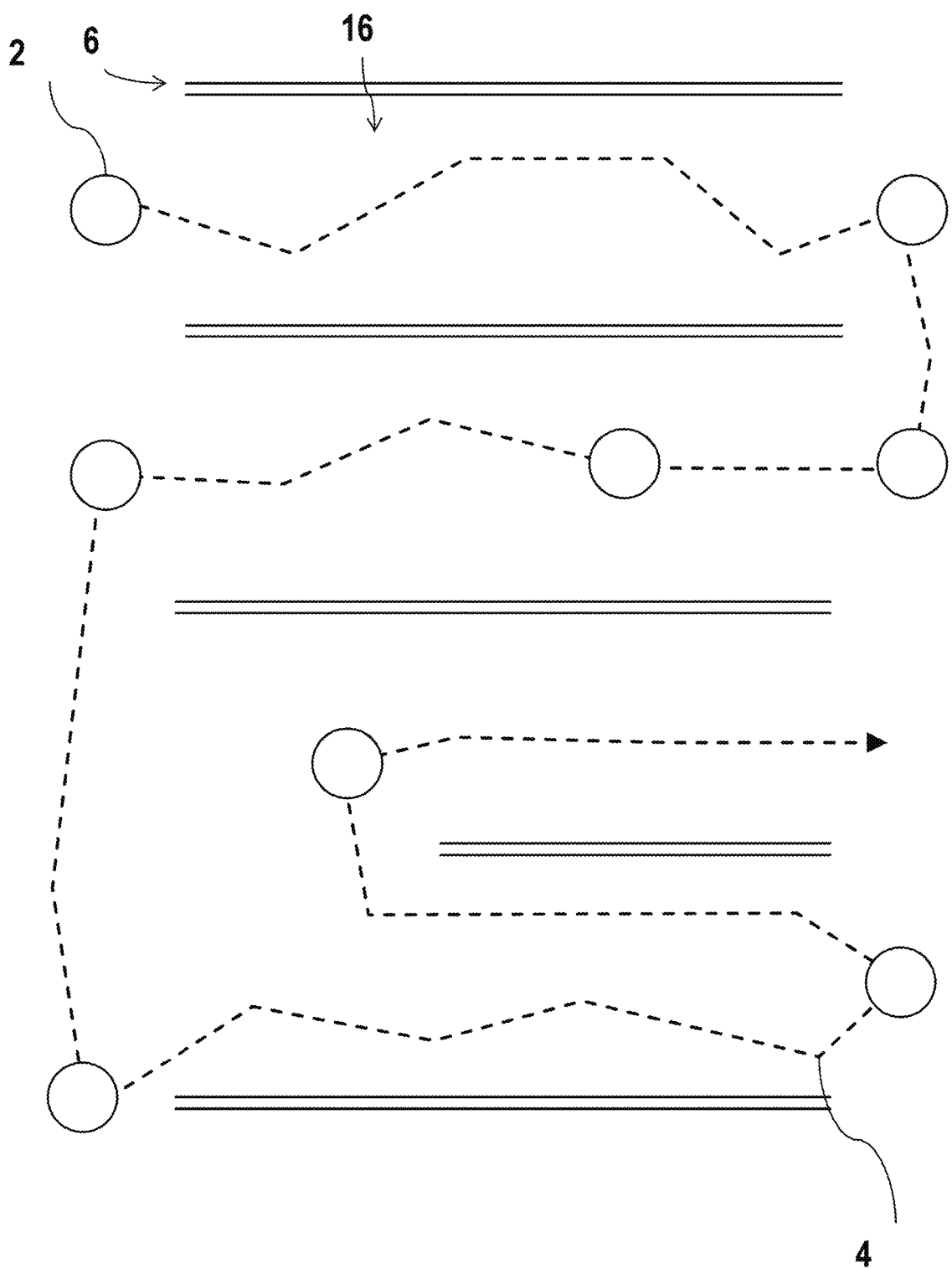
FIG. 2 is a plan view of the robot of FIG. 1 travelling through the facility.

FIG. 2 is a plan view of the robot of FIG. 1 travelling through the facility. The robot 1 may autonomously navigate through the store at any point in the day. For instance, the robot 1 may first navigate through the store before it opens, to establish a baseline inventory analysis for the day. It may navigate through the store several times during business hours, concluding after the store closes.

The robot 1 may be programmed to navigate through specific waypoints 2 in the store. Alternatively, the robot 1 may determine its own waypoints 2. The robot 1 may collect sensor data, such as images, at each waypoint 2, and may attempt to collect sensor data in precisely the same location in relation to each waypoint 2 as possible. The location of waypoints 2 may be determined based on time of day, number of people in the store, aisle size, item density, or other factors. Generally, waypoints 2 may at least be determined based on the robot's 1 field of view and the image size required to accurately identify inventory on shelves 6. In one example, waypoints 2 throughout the store may be calculated once and remain constant for a period of time. In another example, waypoints 2 may be recalculated periodically, such as each day or each week. Waypoints 2 may be determined, or changed ad hoc, by human operators temporarily as well.

The robot 1 may navigate from one waypoint 2 to another. In one example, the robot 1 may determine a route 4 that allows it to reach all of the waypoints 2 in the shortest amount of time. In another example, the robot 1 may determine a route 4 that allows it to reach all of the waypoints 2 while traveling through substantially all of the aisles 16 in the facility. In other examples, the route 4 may vary to avoid customers in the facility, to capture images of certain areas more often, or to navigate through areas of high inventory turnover, among other reasons.

Waypoints 2 may also assist the robot 1 in navigating. For example, the robot 1 may confirm its location within the facility by comparing expected image data with actual image data at a waypoint 2. The robot 1 may expect to capture images of a certain type of product at one waypoint 2, and it may compare the captured images to expected images. If the images are similar enough, the robot 1 may confirm it is at the intended waypoint 2. Conversely, if the compared images are different enough, the robot 1 may confirm it is at another waypoint 2 or is having trouble navigating.

Waypoints 2 may also assist the robot 1 in label and barcode detection. For example, upon reaching a certain waypoint 2, the robot 1 may expect to capture images of certain items within an aisle 16 associated with the waypoint 2. The robot 1 may use this information to detect labels or barcodes more quickly by limiting its search parameters. In another example, the robot 1 may know that items associated with a certain waypoint 2 are commonly misplaced, and may use this information to detect misplaced items more quickly.

Waypoint data may be included as part of the image metadata. For example, time and date of capture, location within the facility, and the robot 1's distance from the product may be included as metadata. Metadata may be used in inventory analytics, discussed in greater detail below.

The robot 1 may communicate waypoint data to a database or a human operator for analysis. For instance, the robot 1 may communicate the waypoints 2 for which it was able to capture images, the percentage of the area around a waypoint 2 that has been imaged, or any issues in capturing images relative to a waypoint 2. If image capture issues arise, human operators can use the waypoint 2 data to pinpoint problems, guide the robot 1, or route around a waypoint 2.

In one implementation, multiple robots 1 may be used in a facility. The robot may work together to achieve distributed imaging of all inventory in the facility. For example, two robots 1 may travel down alternating aisles 16 capturing images until the entire facility has been scanned. In another example, multiple robots 1 may travel substantially exclusive routes, but may overlap in areas with high inventory turnover or known theft. The multiple robots 1 may be in communication with one another.

Figure 3:
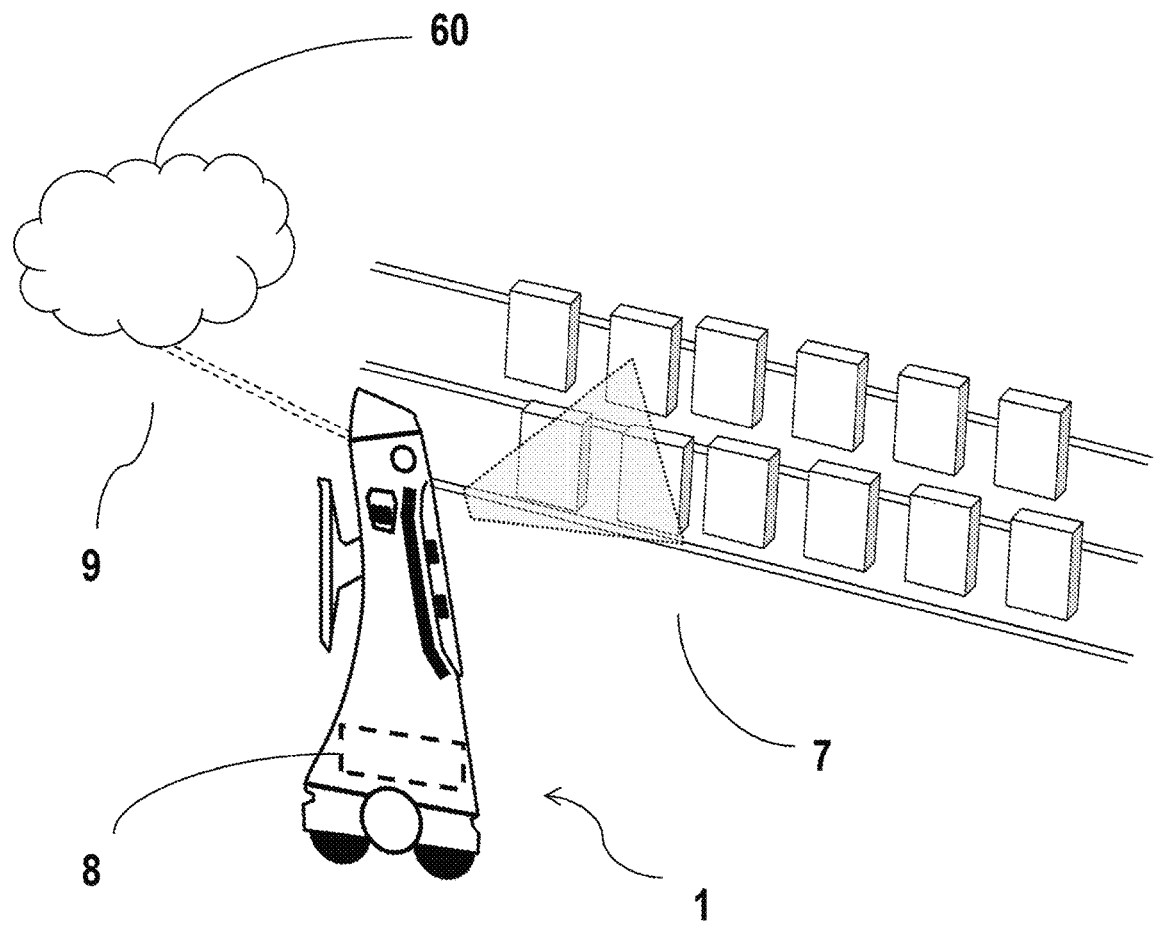
FIG. 3 is a perspective view of exemplary operational processes of the robot of FIG. 1.

FIG. 3 shows a perspective view of exemplary operational processes of the robot of FIG. 1: capturing inventory images 7, processing the inventory images 8, and uploading inventory information 9 to a database on the cloud 60.

Relative to FIGS. 1-3, as the robot 1 travels between waypoints 2, it may perform the process of capturing inventory images 7 using the imaging sensor 20. Depending on the design, in implementation, the imaging sensor 20 may be a camera or camera system. For example, the robot 1 may be equipped with a digital camera that captures the visible, infrared, ultraviolet, radio spectrum, or a combination thereof. In another example, the robot 1 may be equipped with additional imaging sensors 22 such as sonar, LIDAR, radar or other object detection systems. Multiple systems may work together to detect objects within the store. For instance, a visible spectrum camera system may be used to capture images of store inventory, while an infrared camera system may detect persons or obstacles in the path of the robot 1. In another example, the visible spectrum camera system may capture images of store inventory, and a lower-resolution visible spectrum camera system may detect persons or obstacles in the path of the robot 1.

In one example, the robot 1 may use a visible spectrum camera (hereinafter, a "camera") to capture images of inventory along a route 4 between waypoints 2. The camera may be fixed on the robot 1 at a particular height and orientation. This height and orientation may be determined by aisle size, product size, inventory location, lighting conditions, or other factors. The camera may also be movably attached to the robot 1 and may move up or down, forwards or backwards, side to side, or rotationally as it captures images. In one example, the camera may be capable of optical telephoto or digital zoom. The robot 1 may be programmed to adjust the position, angle, and zoom of the camera based on the robot 1's location or expected inventory capture.

The camera may have adjustable exposure settings, such as aperture, shutter speed, ISO, white balance, exposure compensation, gain, capture rate, gamma, and exposure bracketing. This may allow the camera to operate under a variety of lighting conditions, working distances, capture rates, and travel speeds. In one example, the exposure settings may be adjusted in software by the robot 1. Exposure settings may be fixed after being initially set, or they may be adjusted from time to time. In one example, the robot 1 may adjust the exposure settings before each image capture based on the conditions mentioned above. In another example, the robot 1 may adjust the exposure settings based on the inventory to be photographed and the detail or resolution necessary to accurately detect a label or barcode. In yet another example, a human operator may intervene to control some or all of the exposure settings for an image or area, particularly if one or more of the images is not being properly exposed.

In one example, the camera may have a software autofocus feature. The autofocus may operate in conjunction with the label detection software to determine the location of a label within the field of view before the image is captured. The camera may then focus on that portion of the field when capturing the image. For example, if the robot 1 is attempting to capture an image of a particular product, it may take one or more photos of the area where it believes the product to be located. The robot 1 may run label detection software to detect the presence of product labels within the photos. The robot 1 may then capture another image, adjusting the focus to the areas where labels were detected. In this way, the labels will be in focus for image processing and analysis.

The optical components of the camera may be adjusted based on characteristics of the facility or the inventory. For instance, the camera may utilize different lenses in different facilities, such as a wide angle lens where store aisles are narrow and a large focal length lens where store aisles are wider. The field of view of the camera may vary depending on the camera and lens configuration used. The camera may also operate with lens filters, such as polarizers, ultraviolet filters, and neutral density filters, as are commonly used in photography.

The camera may also utilize an onboard flash to provide key or fill lighting when necessary. The robot 1 may determine when to use flash automatically based on the environmental conditions and image capture requirements. For instance, the robot may detect the ambient lighting in the part of the facility where the image is being captured and determine if flash would improve the image exposure. If that part of the facility is bright, such as during midday or when overhead lighting is on, the camera may use little or no flash. If that part of the facility is dimly lit or dark, such as during the evening or when overhead lighting is off, the camera may use more flash. If a part of the facility is bright, but a portion of the item to be photographed is in shadow, the camera may apply some flash to bring out detail in the shadowed area. Individual waypoints 2 may have custom flash settings that may be determined by the time of day, the robot's 1 location within the facility, or the amount of detail resolution needed from a particular image. For example, images requiring very high detail resolution may require neutral exposure in much of the image area. The camera may provide flash for a portion of the image, or for multiple portions of the image area. As another example, a waypoint 2 in the back corner of the facility may always receive flash, but the waypoint 2 immediately next to it may not. As yet another example, a particular waypoint 2 may always receive flash when the robot 1 captures an image at the end of the day, but it may not receive flash during other times of capture. The flash may be direct light, diffuse light, or some combination thereof. The robot 1 may determine when to use direct or diffuse flash lighting based on the waypoint, the time of day, the type of item, or other factors. In addition to compensating for ambient lighting, the robot 1 may provide flash to compensate for other lighting factors such as excess glare, seasonal display lighting, directional or diffuse sunlight, or reflective surfaces. For example, if a seasonal display places items in a location that receives less ambient light than usual, the robot 1 may detect this and add flash when capturing an image. Or, if sunlight unevenly lights an item or area, the robot 1 may add flash to even the exposure.

As another example, if the item to be photographed has a shiny or reflective surface, such as glass, plastic, or foil, the addition of flash may cause the item to be overexposed in the image. In such a case, the robot 1 may employ an off-axis flash or diffuse lighting element, in combination with filters and other hardware, to properly expose the item. Alternatively, the robot 1 may capture an image using normal flash and analyze the image for overexposure from shiny or reflective surfaces. If the robot 1 detects overexposure, it may take additional images at different angles and distances in order to minimize glare. Additionally, the robot 1 may be able to determine the type and number of reflective items based on their reflective characteristics. For example, the robot 1 may learn that a certain type of item creates strong reflections in the area where it is located. The robot may capture images, with and without flash, and analyze the reflections for characteristics of that item. As another example, the robot 1 may capture an image without flash to identify the type of a reflective item, then capture other images with flash to identify the number of those items. The computer 40 may analyze the images with flash to easily count the number of reflective surfaces.

As another example, if the robot 1 is travelling at high velocity, it may require flash to properly expose the image. At a high travel velocity, the shutter speed of the camera must increase to prevent motion blur on the imaging sensor 20, and increased shutter speed means that the imaging sensor 20 captures less light when making the image. Therefore, the robot 1 may use flash to brighten the image properly.

A flash may also be used to provide backlighting for the image. For example, when the robot 1 attempts to determine whether an item is out of stock, it may analyze the middle ground or background of the image for clues that items are missing. If a portion of the shelf is visible, or if no item details are detected, the computer 40 may determine that the item is out of stock. Backlighting may help to properly expose for these areas in the image. Additionally, the robot 1 may employ a shade on occasion to block or diffuse harsh direct lighting. For example, where ambient or overhead lighting casts uneven shadows over an item to be photographed, it may be difficult for the computer 40 to process the image. The robot 1 may place a shade between the light source and the item in order to even the exposure on the item.

The robot 1 may capture images at several points throughout the facility. Depending on the design, in implementation the robot 1 may capture images of one type of item at a time. In another example, the robot 1 may capture images of multiple types of items at a time. The subject matter captured in an image may be determined by the robot 1 based on item characteristics such as item or label size, field of view of the camera, or other factors. The robot 1 may capture several images in rapid succession for image stacking or superresolution processing. In image stacking, multiple images captured from the same location may be overlaid and blended to bring out details in the final image. Each successive image may have different exposure settings or focus points. The final, composite image may have a higher dynamic range or a wider depth of focus than any of the individual images, allowing the robot 1 to better detect subject inventory in the image. In superresolution, multiple images captured as the image sensor moves or is moved slightly, creating subpixel shifts in the intensity of light captured in each image. The combined images can be used to resolve details of finer resolution than in any one image. After capture, the images may be stored in memory onboard the robot 1. The robot 1 may automatically determine when to capture multiple images and apply image stacking or superresolution techniques during image processing.

Figure 4:
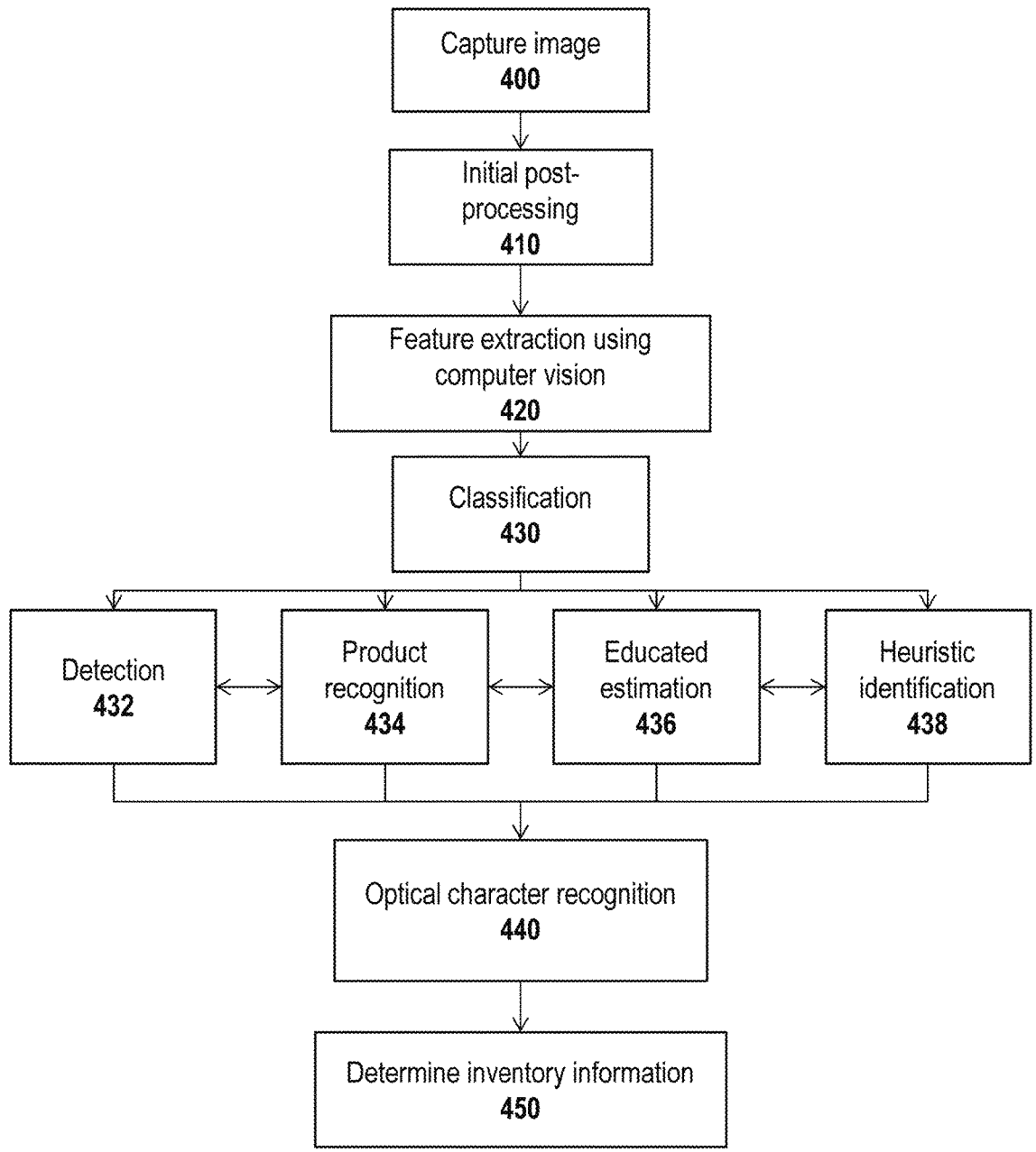
FIG. 4 is a flow chart showing an exemplary process for determining inventory information using the robot of FIG. 1.

FIG. 4 is a flow chart showing an exemplary process for determining inventory information using the robot of FIG. 1. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Relative to FIGS. 1-4, once an image has been captured as shown in box 400, it may be processed using initial post-processing, computer vision, neural network, machine learning, or deep learning techniques. For instance, important features may be extracted from the image using computer vision. The computer 40 may then apply neural network, machine learning or deep learning techniques to process the extracted features. The computer 40 can use this processed information to detect the location of items, labels, and barcodes.

Generally, this kind of image processing uses an image data set to train the computer 40 to detect stock items. The computer 40 may be given images showing the items, the labels, the items in stock, the items out of stock, and similar variations. The computer 40 may use these images to learn the characteristic qualities of the item or the level of stock. With each subsequent viewing, the computer 40 learns more about the characteristic qualities.

Image processing may be based on a number of approaches used alone or in concert. For instance, as shown in box 410, image processing may begin with initial post-processing techniques such as adjusting exposure, white balance, highlights, shadows, image rotation, or cropping. These techniques may make the image easier for the computer 40 to process further. As shown in box 420, the computer 40 may extract features from the image using computer vision techniques. Extracted features may further prepare the image for processing.

The computer vision techniques may be particularly useful in performing label extraction of products, barcode detection and extraction of products, determining if an item is out of stock or in stock, and with providing a street view of an indoor environment. Relative to label extraction, the robot 1 may utilize color thresholding and contour detection to determine the location of the labels of products containing the label information. The extracted labels are then used for barcode detection. Barcode detection may utilize a gradient magnitude of the image (label) in horizontal and vertical directions, which can be determined using one or more imaging processing operators. For example, Scharr operators, which result from an optimization minimizing a weighted mean squared angular error in the Fourier domain, may be used to detect barcode edges. The region with high horizontal gradients and low vertical gradients may be identified. High frequency noise may be smoothed from the gradient image. Blurred images may be subject to thresholding and morphological operators are applied on the thresholded image. Using contour detection, the barcode region from a label is extracted, which permits identification of the item information, a price, a location of the item, and a window size for searching for the item in an image.

As shown in box 430, a classification approach may be used to assist in label or barcode detection. The classification approach uses labels and barcodes cropped from raw images to build classifiers that help the software recognize items. Classifiers may be managed at different hierarchical levels to detect stock and recognize products. For instance, classifier levels may include, but are not limited to: data from all stores, data from a single store, data from a single department across all stores, data in a single department in a single store, data for a particular product category across all stores, and data for a particular product category in a single store. After the classifiers are built, they may be improved using captured image data or data from previous results.

Boxes 432, 434, 436, and 438 show other approaches that may be used, in detecting inventory and determining inventory information. As shown in box 432, detection approach may be used to identify whether any items are out of stock by considering, without looking at every item in the image, whether there appear to be any items out of stock. The detection approach uses the entire image to train a classifier which determines the location of an item and whether any stock is missing. As shown in box 434, a product recognition approach may use data extracted from labels or barcodes to create product categories. Product categories can assist in building classifiers using neural network, machine learning, or deep learning techniques. As shown in box 436, an educated estimation approach may compare images from previous captures to determine how much stock remains. As shown in box 438, a heuristic identification process may be used to identify an item by its price label. The heuristic process compares previous images captured under similar conditions, such as location in the store or distance from the item, to new images, comparing detected features and other data.

As shown in box 440, the robot 1 may use optical character recognition algorithms to extract text from labels. Once a label has been detected, the computer 40 may run optical character recognition algorithms to extract product names, SKU numbers, barcodes, prices, and the like. The computer 40 may determine a confidence level for any information extracted using these algorithms. If the computer 40 is not able to extract the optical character recognition information with enough confidence, it may upload a high resolution image to the database 60 for further optical character recognition processing. The computer 40 may use partial information or information from more than one category to determine the type or number of items.

It is noted that the processes described herein may be used with multiple images compiled together, so-called "image stitching". Image stitching may be implemented to account for the regions of an image that are close to the borders of the image, in order to increase the usable area of an image. For instance, if an item or label is located between the opposite borders of two consecutive images, for instance, between the left border of one image and the right border of the next image, the computer 40 may stitch the images together and extract the inventory information from the combined image.

As shown in box 450, these processes can be used to determine inventory information. Using the locations of detected labels or barcodes, the computer 40 may determine where items are located on a shelf or in an aisle. Additionally, the computer 40 may use the locations of detected labels or barcodes to determine stock status, i.e., whether an item is in stock, low on stock, or out of stock. For example, to determine which items are in-stock or out-of-stock, a morphological operator may be applied to the structure background. Commonly, aisles in retail stores are classified into three different categories: pegs, shelves, and trays. Considering peg items, for example, if an item is out of stock, the computer 40 may have detected circles in the aisle backing. Around the label, the circle density within a given area may then be determined. If the circle density is high, the computer 40 may determine that the item is low stock or out of stock.

In another example, the robot 1 can determine stock quantity data using additional imaging sensors 22, such as radar, sonar, or LIDAR sensors in combination with computer 40 vision techniques. This may be useful in helping the computer 40 identify items with changing packaging or appearance. In one example using radar, the robot 1 may emit radio waves using a transmitter as it travels between waypoints. A radar sensor may detect reflected radio waves, and the computer 40 may process the detected data to determine the number of items in stock or on display. The radar sensor may be a millimeter-wave sensor (MMW) capable of detecting electromagnetic radiation in the extremely high frequency (EHF) band, between 30-300 GHz. MMW sensors may detect items at a distance of up to several meters and within a resolution of a few centimeters. For instance, an integrated transmitter/receiver MMW chip, such as the Texas Instruments® IWR1443, which operates between 76-81 GHz, may be used to detect and resolve items just a few centimeters apart on a shelf. MMW sensors may be used at high travel velocity and without ambient lighting. In another example, data from the radar sensor may be used in combination with captured images to accurately determine stock quantity data. For instance, the robot 1 may transmit and detect radio waves at about the same time the camera is capturing images of a product area. The computer 40 may process both sets of data together. The radar data may first be processed using computer 40 vision techniques to determine an estimated number of items on display. The captured image data may then be processed to detect and extract labels or barcodes. This inventory information may be cross-referenced with determinations made using the radar data to accurately determine stock quantity. These steps may be performed in any combination, order, or recursion necessary to determine stock quantity and other inventory information. This may be especially useful for products of small size and shape, for example, screws and other small hardware components. The computer 40 may also use machine learning, deep learning, and neural network approaches to learn how to process this data together. In another example, data received from sonar or LIDAR sensors may be processed alone or with captured images in a similar manner. The robot 1 may have multiple radar, sonar, or LIDAR sensors, or any combination thereof. The robot 1 may determine when to use one or more of the sensors alone or in combination with the image sensor based on environmental conditions, product or label size, speed of travel, or other factors. For instance, a robot 1 operating in a low light environment may use two or more sensors to capture item data to increase the information available for processing. Or a robot 1 traveling at a high velocity may use two or more sensors to capture item data in order to overcome blurry or underexposed captured image data.

In yet another example, the robot 1 may use multiple sensors in sequence to improved captured data. For instance, the robot 1 may be equipped with radar and image sensors, with the radar sensor placed ahead of the image sensor in the robot 1's direction of travel. The radar sensor may capture preliminary data that the computer 40 may process to indicate the quantity of items on display. The robot 1 may use this information to adjust the camera settings, such as exposure, aperture, or number of images taken, to properly capture all of the items on display. This process may be done with any combination and number of sensors.

The robot 1 may perform image capture and processing even when it is not connected to the internet. Images and results may be saved to the robot's memory and uploaded once a connection has been restored.

Figure 5:
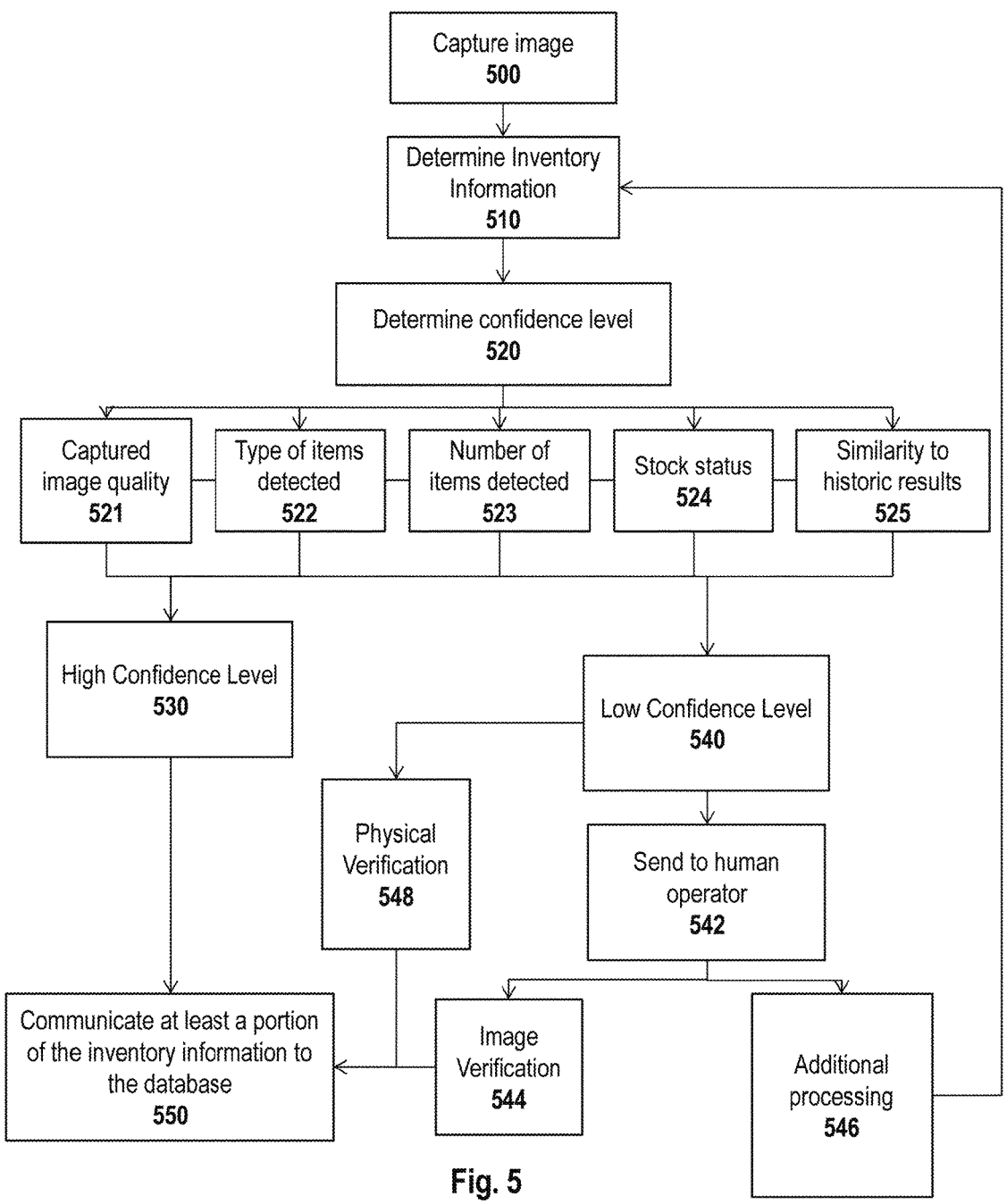
FIG. 5 is a flow chart showing an exemplary process for determining a confidence level for the inventory information using the robot of FIG. 1

FIG. 5 is a flow chart showing an exemplary process for determining a confidence level for the inventory information using the robot of FIG. 1. After capturing an image, as shown in box 500, and determining inventory information, as shown in box 510, the computer 40 may determine a confidence level for the inventory information, as shown in box 520. The confidence level may be determined by a number of factors, as shown in boxes 521-525, including captured image quality, the type of items detected, the number of items detected, the stock status of the items, similarity to historic results, respectively. Other factors known to those of skill in the art may be considered. In one example, the computer 40 may assign a higher confidence level for images taken in optimal lighting conditions or clearly showing a label or a barcode. The computer 40 may assign a lower confidence level for images with low contrast, or where a label or barcode is obscured. Similarly, the computer 40 may assign a higher confidence level for images where the type and number of products can be accurately determined, while assigning a lower confidence level where the computer 40 cannot make a determination. Further, the computer 40 may assign a higher confidence level where the determined inventory information is similar to historically determined inventory information, but assign a lower confidence level where the determined inventory information varies in a statistically significant way. In one example, the computer 40 may use some combination of these factors in determining the confidence level. Some factors may be considered more or less heavily, i.e., given weights, depending on the presence and extent of the factors.

As shown in box 530, inventory information with a confidence level above a threshold may be communicated to the database 60, as shown in box 550. This information may automatically be entered. This threshold may be the same for all items in a commercial facility, or it may differ from item to item. For example, an extremely high confidence level may be desired for expensive, high margin items, or items prone to theft. A lower confidence level may be acceptable for less expensive or low margin items, as there may be too great a trade-off between accuracy and the effort required for accuracy. Threshold confidence levels may be determined by the robot 1, the database 60, facility owners, or other software. Threshold confidence levels may be changed on occasion, for example, seasonally.

As shown in box 540, inventory information with a confidence level below a threshold may not be automatically entered by the database. In box 542, inventory information with a confidence level below a threshold may be sent to a human operator for additional analysis or confirmation of results. The human operator may use the image to manually determine inventory type, label, amount, or stock status, as shown in box 544. The human operator may then direct the database to enter the inventory information, as shown in box 550. Alternatively, as shown in box 546, the human operator may send the inventory information back to the robot 1 for additional processing and further communication to the inventory database 60. In one example, inventory information with a confidence level below a threshold may direct the robot 1 to capture additional images for the subject inventory. The robot 1 may return to the portion of the facility where the image was taken and take another image. The subsequent image may be processed and compared with the original image for confirmation of results. As shown in box 548, inventory information with a confidence level below a threshold may also direct the robot 1 to ask a human employee in the facility to physically verify the results within the facility. The employee may check the inventory status and report it to the database 60, which may compare the inventory status with the original inventory information and submit that to the database.

When detecting inventory details such as labels or barcodes, the robot 1 may use high resolution images for feature extraction. These images may have large file sizes, and a typical retail store environment may not have sufficient internet bandwidth to upload the images in or close to real-time. To circumvent this issue, the computer 40 may perform a portion of the image processing onboard. After the computer 40 has finished the image processing necessary to detect and identify, it may upload portions of images to the cloud for further processing or for validation by a human operator. For example, the robot 1 may capture an image of an item and run its processing software onboard. After the item has been identified by its label, the computer 40 may crop the label from the image. The label may be uploaded at full resolution, while the original image may be uploaded at a lower resolution for later display or other analysis. As another example, after an item has been identified by its barcode, the computer 40 may crop the barcode from the image. The barcode may be uploaded at full resolution, while the original image may be uploaded at a lower resolution for later display or other analysis. As another example, when the computer 40 is attempting to detect the amount of stock on display, it may analyze the entire high resolution image in an effort to reach a decision above a threshold confidence level. If it can make a determination above the threshold confidence level, the computer 40 may upload a low resolution image, or no image at all. If it cannot make a determination above the threshold confidence level, the computer 40 may upload all or part of the high resolution image.

Figure 6:
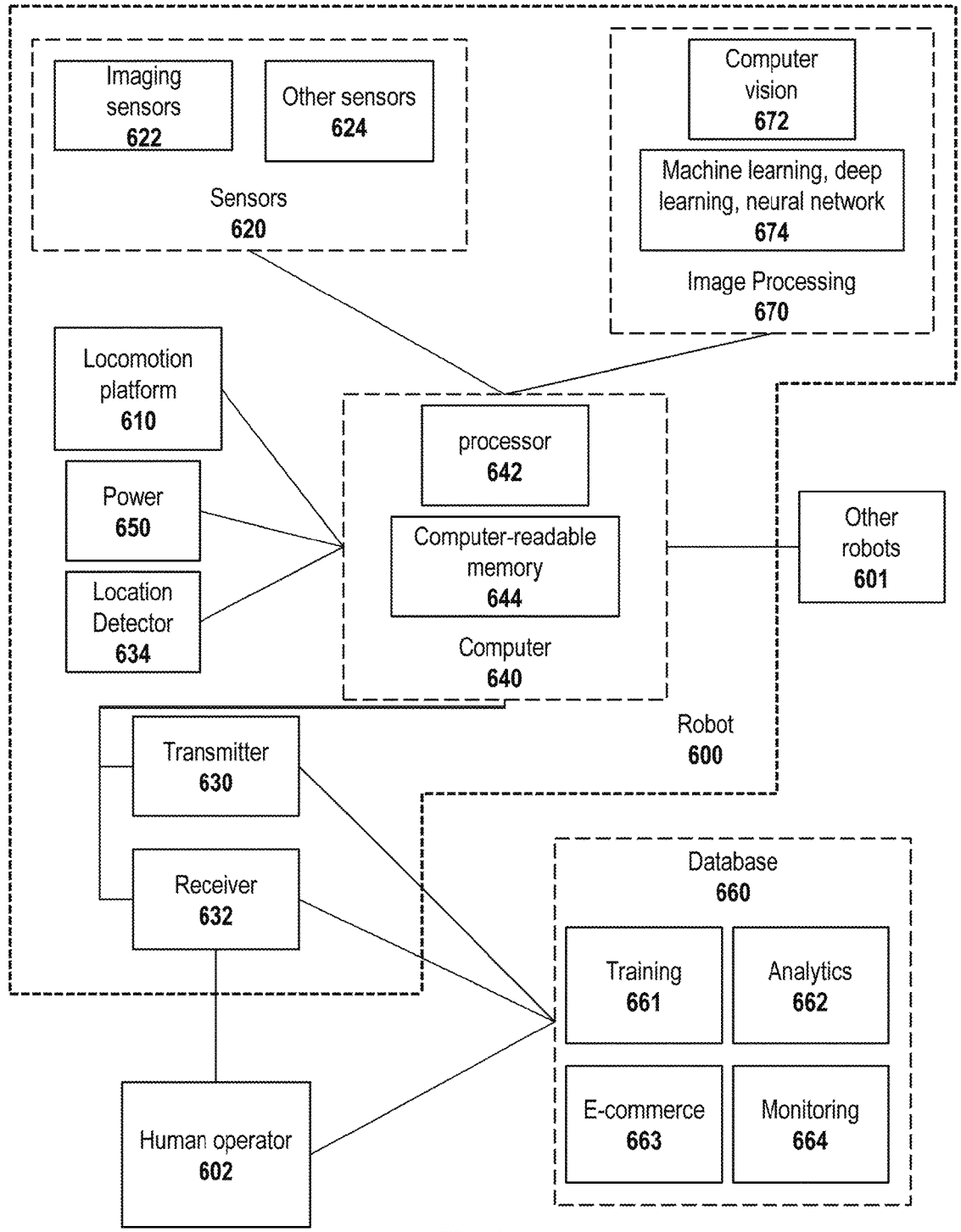
FIG. 6 is a block diagram of exemplary systems operating within and external to the robot.

FIG. 6 is a block diagram of exemplary systems operating within and external to the robot 600.

Block 600 shows the robot and all of the hardware and software systems within. Block 601 shows that the robot 1 may operate in conjunction and communicate with other robots. Block 602 shows a human operator that may be contacted by the robot 600 or the database 660.

Additional hardware systems are shown in blocks 610, 650, 634, 630, and 632. Block 610 shows the locomotion platform system. Block 650 shows the power system. Block 634 shows the location detector system. Blocks 630 and 632 show the transmitter and receiver systems, respectively.

Block 640 shows the computer system having a processor 642 and computer-readable memory 644.

Block 620 shows the sensors system having image sensors 622 and other sensors 624. The other sensors 624 may be temperature sensors, smoke detectors, carbon monoxide monitors, and the like. The robot 600 may use these other sensors 624 to passively monitor for fire, carbon monoxide gas, or other environmental conditions adverse to inventory and humans. If adverse conditions are detected, the robot 600 may send an alert to a human operator for further action. The robot 600 may capture images of the affected areas and send them to the human operator for additional confirmation of the adverse conditions. The images may be sent to the database and marked to indicate potential problem areas or areas where items may be damaged.

Block 660 shows the database system. The database system 660 may have, as an example, training 661, analytics 662, and e-commerce 663 subsystems, among others.

The training system 661 may help the computer 640 to learn to recognize inventory items, labels, barcodes, and stock status in a number of ways. Training may be accomplished using images stored on the computer 640, on the database 660, or shared from the database to the computer 640. The computer 640 may initially learn inventory characteristics by applying machine learning techniques to a set of training images designed to teach the computer 640. The training images may show generic labels, barcodes, or other inventory characteristics, and the computer 640 may learn to recognize the characteristics based on relationships between like images. The training images may be customized to show inventory characteristics for a particular commercial facility. This may help the computer 640 learn more efficiently. Initially, the computer 640 may learn to identify the labels and barcodes of an item by corroborating with a price tag located on the shelf underneath or nearby the item. Price tags on shelves may be relatively static, and therefore, easier to identify with image processing. The computer 640 may attempt to detect an item's label or barcode, detect the item's price tag, and compare both results to determine a higher confidence level. After some time, the computer 640 may be sufficiently confident with the results of the label or barcode detection that it does not confirm with the price tag detection. Additionally, the computer 640 may learn inventory characteristics from an initial image set processed with mechanical turk, i.e, using human intelligence to process images while the computer 640 discovers relationships between the processed images. After some time, the computer 640 may recognize inventory items, labels, barcodes, and stock status without the human contribution.

The computer 640 may also learn inventory characteristics from captured images taken during operation of the robot 1. As the robot 1 captures images and processes them to detect inventory, it may develop or refine the rules it uses to detect inventory characteristics. This may be done in real-time, as the robot 1 is operating, or during idle time when the robot 1 is charging or otherwise not in use. The robot 1 may use captured images from other robot is in the same facility or other facilities to learn inventory characteristics as well. The robot 1 may be able to download images from the database to use in learning. To this end, the database may identify and make available images that are particularly helpful in robot 1 learning.

The computer 640 may also learn inventory characteristics from captured images that resulted in confidence levels below a threshold. The computer 640 may use these captured images to understand why the confidence levels fell below the threshold, and develop rules for determining increasing confidence levels under those scenarios. The computer 640 may also use results obtained when it communicated those images to a human operator. The computer 640 may develop rules to understand why the human operator made a particular decision. In one example, the robot 1 may use low confidence level images from other robot is to learn inventory characteristics as well. The robot 1 may be able to download images from the database to use in learning. To this end, the database may identify and make available images that are particularly helpful in robot 1 learning.

Classifiers and other types of rules may be improved using captured image data or using data which produced an incorrect result.

The analytics system 662 may provide detailed analysis of inventory information for human end users. By example, several types of analysis are discussed below.

Inventory information may be used in planogram analytics. For example, inventory information concerning the location and placement of items in the commercial facility may be compared to the location and placement of items dictated in a planogram. Users can use this comparison to ensure that items are placed in the proper locations in one facility. Other users may be able to monitor compliance with planograms across multiple facilities, for example, in franchise locations. Further, images and related data gathered by the robot 600 may be useful in comparing different planogram layouts. In one example, a user may wish to compare the effectiveness of two or more different planogram layouts in multiple facilities. The facilities may stock their shelves or displays according to the planograms, the robot 600 may capture, analyze, and communicate inventory information, and the database 660 may enter the inventory information from the facilities. The user may then use the information to compare sales, inventory turnover, product misplacement, or any combination thereof across the facilities. In another example, a user may wish to determine how multiple facilities unintentionally deviate from the prescribed planogram layout. The user may use the inventory information in the database 660 to quantify deviation across the facilities. In another example, the user may wish to correlate unintentional planogram deviation with sales or inventory turnover in a facility. In still another example, planograms may be software-optimized based on inventory information from the database 660 and sales goals for a facility. Planogram analysis may not be limited to one item or one area of the facility at a time. The database 660 may allow analysis of overall planogram compliance in one facility, or in multiple facilities. The database 660 may also allow analysis of planograms containing complementary or related items in different parts of the store. For example, the database 660 may allow a user to analyze how planogram compliance in the wine section and the cheese section is related to sales or inventory turnover.

Inventory information may be used to analyze stock data, such as the number of empty spots or out-of-stocks detected in an area or over a period of time. The analytics system 662 may analyze the percentage and number of discrepancies spotted in an area over time, the number of units of missing inventory, the number of out-of-stock events over a period of time, and opportunity costs because of products missing from a shelf. The analytics system 662 may also provide a heat-map of the facility showing where out-of-stocks occur over time.

The analytics system 662 may provide pricing analytics. For instance, inventory information can be used to provide real-time or near real-time analysis with competitors. In one example, software on the database 660 may pull stock and price information from competitors' websites. That information can be compared with the inventory information determined by the robot 600 to provide a customer or store employee with accurate pricing and stock data. In another example, this comparison may allow stores to offer dynamic pricing based on the pricing and availability of similar items in a nearby geographic area. For instance, if the database 660 software determined that demand for a particular item was high, but availability in the area was low, it could communicate a suggested increased price to a user. Or, if availability was high and demand was low, it might communicate a suggested decrease price to a user. This dynamic pricing may be used within several stores under the same ownership to better price inventory based on demand and availability.

In another example, pricing analytics can be used to ensure correct pricing within a facility. The robot 600 may be able to extract price information from the labels using optical character recognition, as discussed above. The computer 640 may then cross-check the extracted price information with price information contained within the database 660 or stored onboard to verify that the marked price of an item is the same as the intended price. If there is a discrepancy, the computer 640 may communicate it to the database 660 for further action by a human operator.

In still another example, the analytics system 662 may track and analyze a facility's responses to low inventory events, theft, and discrepancies. For instance, the analytics system 662 may track the number of low inventory events, the number of events resolved over time, the nature of resolutions, and the like. The analytics system 662 may also track employee information, such as which employees responded to events, response time, response effectiveness, and the like.

The analytics system 662 may also assist in tracking theft. When the computer 640 determines an area to have decreased inventory, employees may physically go to the area to confirm. In some cases, employees may simply restock according to a planogram. In other cases, the employee may be able to determine that one or more items have been stolen, such as when damaged packaging remains, but a product is missing. In those cases, the employee may be able to note the theft in the database 660. The robot 600 may use this information in combination with machine learning or deep learning techniques to learn to detect theft automatically. To this end, the database 660 may identify and make available images of known theft for robot 600 learning. In another example, the robot 600 may adjust its route or waypoints to capture images more frequently in areas with known theft. The analytics system 662 may provide analysis of known theft, including times, locations, and item types, to allow facility owners to better protect this inventory.

The e-commerce system 663 may provide a platform for internet sales of items located within the facility. The database 660 may maintain inventory and location data for every item in a commercial facility, or across multiple facilities. E-commerce customers seeking to purchase items may interact with the database 660, which may search for in-stock items and provide location data to customers. In another example, once a customer places an order online, store associates may use the database 660 information to fill the order accurately and efficiently. For instance, a store software interface might communicate the customer's order to the associate, along with an optimal route for gathering items to fulfill the order. In still another example, the database 660 may display to the customer one or more of the captured images containing an item, allowing the customer to see the item, its packaging, and its location within a store. In still another example, the database 660 may actively communicate the stock status, price, regional availability, or other information about an item to a customer who is considering buying the item. This may allow the customer to decide to purchase when an item becomes available within a certain geographic region, or when the price within a geographic region has reached a desired level. This may also allow a customer shopping in one physical location to purchase from another physical location.

The monitoring system 664 may help human operators ensure that the robot 600 is functioning properly. In one example, the database 660 may enter information useful for troubleshooting or calibrating the robot 600. For instance, the database 660 may include information about waypoints where image data was and was not captured. This may help human operators determine why the robot 600 was unsuccessful. As another example, the database 660 may include information about the percentage of an area that was successfully imaged or analyzed. This may help human operators determine where waypoints need to be adjusted or where environmental conditions need to be improved. The robot 600 may send maintenance information, such as bug reports, test data, alerts, and notifications, to the database 660 or to human operators.

In another example, when multiple robots 600 are deployed within a facility to perform distributed imaging of the inventory, the monitoring system 664 may monitor the robots 600 to ensure proper coverage of the facility. For instance, the monitoring system 664 may analyze the location and capture time of images as the robots 600 upload them to the database 660. The monitoring system 664 may compare this information to expected routes and may direct one or more of the robots 600 to change routes. In another example, the monitoring system 664 may coordinate the deployment and return of robots 600 during peak business hours. In still another example, if one or more robots 600 sends inventory information with a low confidence level to the database 660, the monitoring system 664 may direct another robot to capture another image to improve on or verify the results.

All of the database systems 661-664 may be accessed using a graphical interface through a software application or a website. The interface may work with a virtual model of the shelves and aisles in facility, such as a "master-shelf" model which maintains a virtual representation of all of the inventory information communicated to the database. The virtual model may not be a visual representation, but may be primarily a numerical representation of the inventory. The virtual model may be updated each time the robot 600 communicates new inventory information to the database 660. Old inventory information may be maintained, averaged, or weighted with the new inventory information to provide a historical representation of the inventory information over time. Significant events, such as out of stock determinations, may cause the virtual model to be updated. The virtual model may use historic inventory information to form a general representation of a facility, i.e., a model of the way the facility is usually stocked and where items are usually located. The robot 600 may use information from this general representation to detect low stock, stolen, or misplaced items by comparing a recently captured image with the general representation.

Figure 7A:
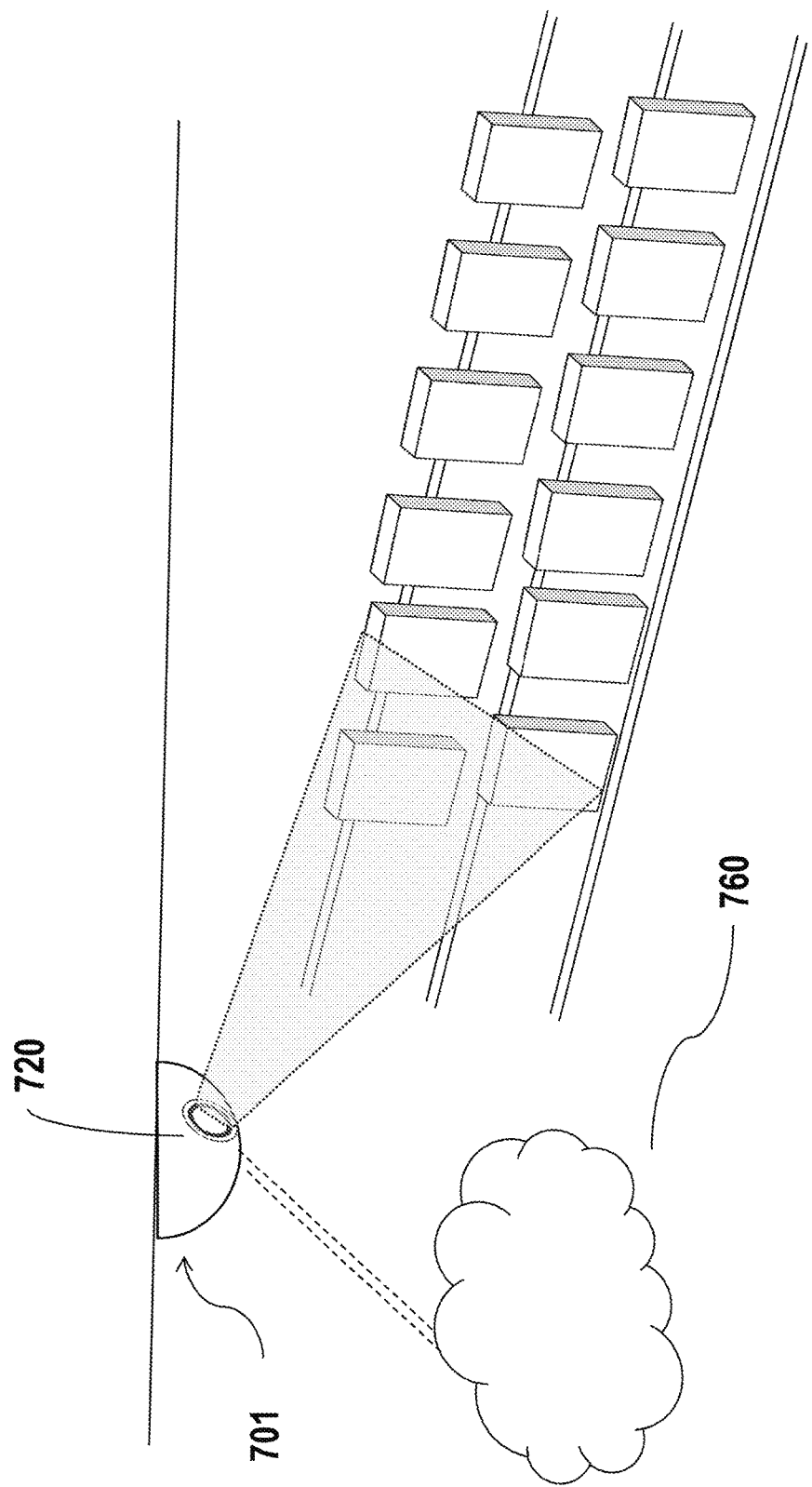
Figure 7B:
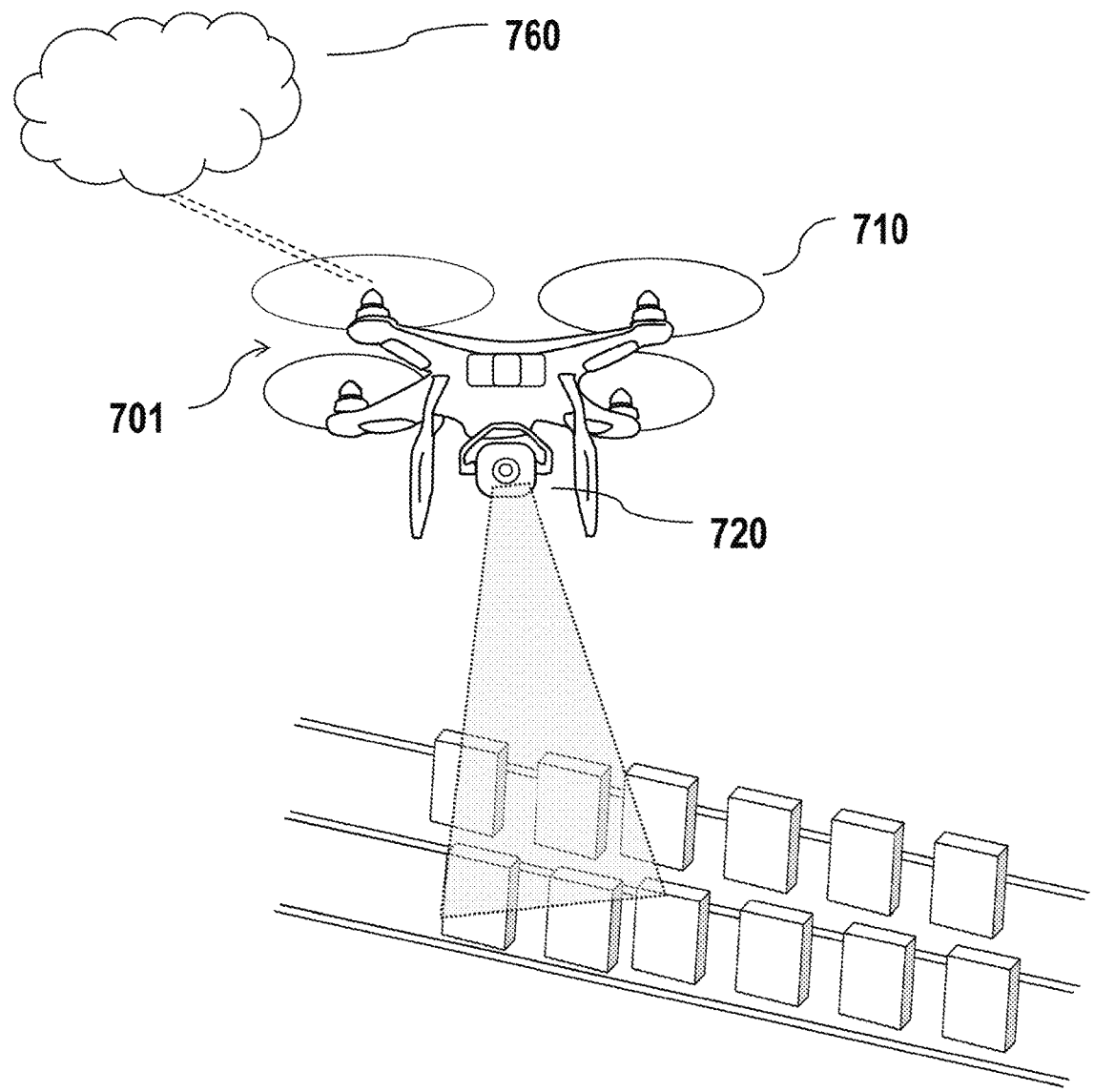

FIGS. 7A-B show exemplary embodiments of additional shapes and designs of the inventory management device contemplated within the scope of this disclosure.

FIG. 7A shows a device 701 designed as a camera system suspended from the ceiling. The imaging sensor 720 captures images of inventory and communicates at least a portion of inventory information to a database 760. The camera system may be stationary on the ceiling, fixed on one area in particular. Multiple camera system devices 701 may be deployed throughout a facility to effectively cover substantially all of the facility. In some cases, camera systems may be deployed in front of important, high volume, or high value areas of the facility to provide a minimum amount of coverage of those areas. In one example, the camera system may be mounted to a wall, a shelf, a column, or another sturdy element. In another example, the camera system device 701 may rotate in one or more directions to allow the imaging sensor 720 to capture images in other portions of the facility. For instance, the device 701 may rotate parallel to the ceiling to allow imaging of items within a field of view as wide as 360°. The imaging sensor 720 may pivot perpendicular to the ceiling to allow device 701 to image the items at a better angle. In another example, the device 701 may be robotic, with a locomotion platform resembling one or more tracks located along the ceiling. The device may move along the tracks using a rolling system in order to reach waypoints for image capture. Once the device has reached the waypoints, it may capture an image from above the items.

FIG. 7B shows a robot 701 designed as an aerial drone, with a locomotion platform 710 of propellers. The imaging sensor 720 captures images of inventory and communicates at least a portion of inventory information to a database 760. A drone embodiment of the robot 701 may be particularly useful in retail facilities with tall shelves or outdoor product displays. For instance, a drone embodiment of the robot 701 may be used in a building supply facility that carries large items or has tall shelves. The drone may easily capture images of large inventory or inventory stored at height, since the drone may fly at varying altitudes. The drone may perform multiple imaging passes this way, assigning waypoints to different heights within the facility. One aisle may have waypoints for items at ground level, waypoints for items at a second level higher up, and so on. A drone embodiment of the robot 701 may also be particularly useful in large consumer warehouse facilities, where items are often stored at height. In these facilities, the risk of interaction with humans may be minimized. Additionally, the drone may also be used to provide order fulfillment while it is capturing images for inventory management. For example, a drone may be dispatched to a part of the facility to retrieve a product for shipment to a customer. Along the way, the drone may capture images of other items in the facility. The drone may capture images when taking the product to a fulfillment area. This may expedite inventory management by combining it with other routine activities.

FIG. 8 is a flow chart showing a method of inventorying a commercial facility with a robot. As shown in block 800, a robot is provided within a commercial facility, wherein the robot has a locomotion platform, at least one imaging sensor for detecting inventory, a transmitter for sending inventory information to a database, a receiver for receiving inventory information from a database, and a robot computer in communication with the locomotion platform, the at least one imaging sensor, the transmitter, and the receiver, the robot computer having a processor and computer-readable memory. As shown in block 810, inventory images are captured from the at least one imaging sensor. As shown in block 820, inventory is detected by comparing captured inventory images with stored inventory images. As shown in block 830, a confidence level is determining for the inventory information. As shown in block 840, at least a portion of the inventory information is communicated to the database.

FIG. 9 shows one exemplary embodiment of a system 900 for performing inventory management within a commercial facility. The system 900 includes at least one imaging sensor 920 for detecting inventory, a transmitter 930 for sending inventory information to a database, a receiver 932 for receiving inventory information from a database 960, and a computer 901 in communication with the at least one imaging sensor, the transmitter, and the receiver. The computer has a processor and computer-readable memory, and is configured to capture inventory images from the at least one imaging sensor 920, detect inventory by comparing captured inventory images with stored inventory images, determine inventory information, determine a confidence level for the inventory information, and communicate at least a portion of the inventory information to the database 960. In one example, the system 900 may include a tablet or smartphone having the imaging sensor 920, transmitter 930, receiver 932, and computer 901. Employees may carry the smartphone or tablet during the day and capture images at specific or predetermined intervals. In another example, the smartphone or tablet may be affixed to a shopping cart and may capture images as customers shop through the store. The smartphone or tablet may communicate inventory information while in use. The smartphone or tablet may alternatively store inventory information until the employee or the customer has returned the device.

Figure 10:
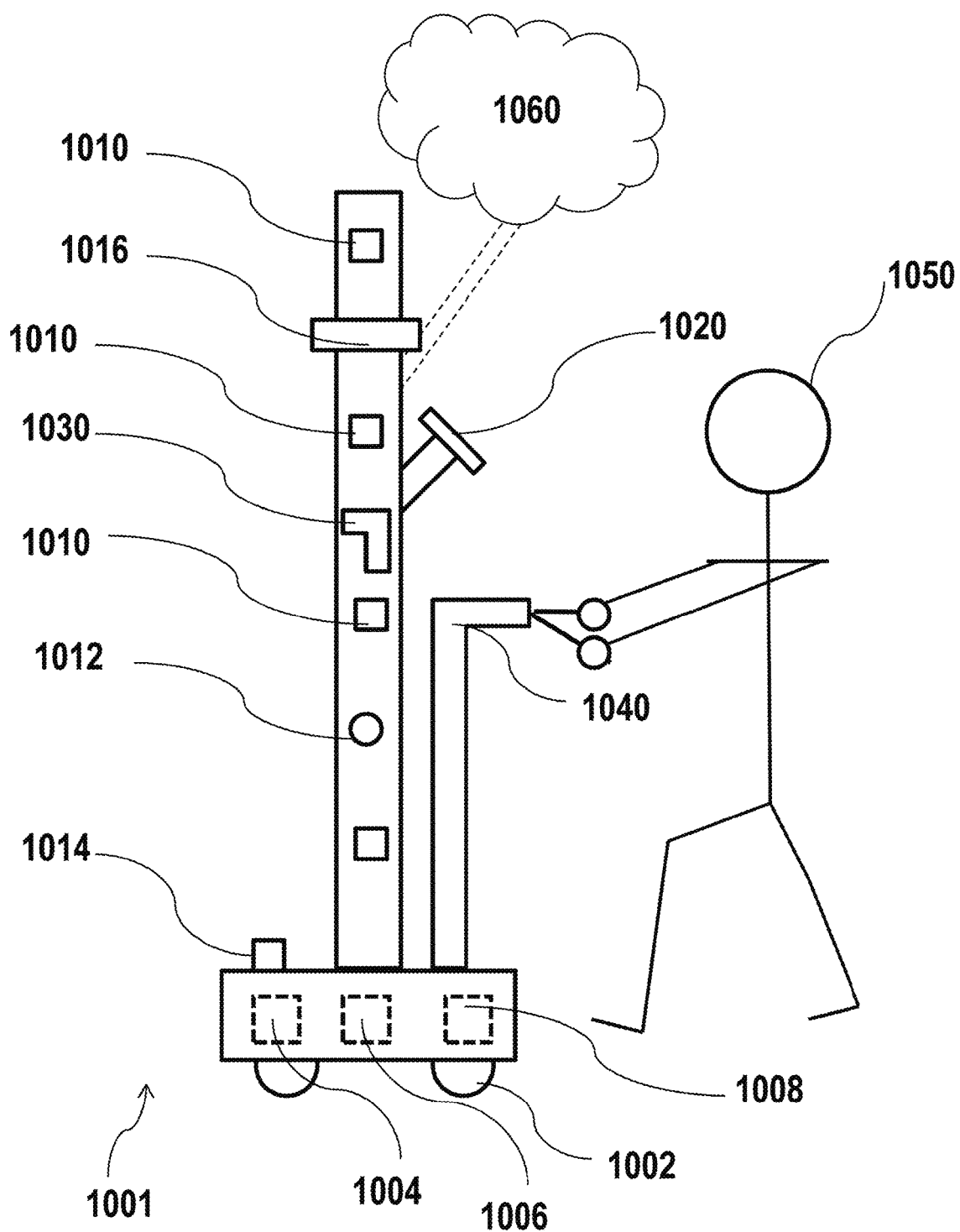
FIG. 10 shows a user-driven embodiment of a system for performing inventory management within a commercial facility.

FIG. 10 shows a user-driven embodiment of a system 1001 for performing inventory management within a commercial facility. The system 1001 may include a user-drivable sensor platform having a steering mechanism 1040 and wheels or castors 1002. The user 1050 may use the steering mechanism 1040 to push, pull, and direct the motion of the platform. The platform may include electronic components similar to the examples above, including a battery 1004, wireless communication equipment 1006, and a computer 1008. The electronic components 1004, 1006, 1008 may be in electrical communication with each other and the other components included in the system 1001. The platform may be lined with a combination of 2D and 3D sensors. For example, shelf sensors 1010 may be placed at several points along a vertical column on the platform. Each sensor 1010 may image portions of a shelf at a given height as the platform is maneuvered through the commercial facility. Other sensors, such as distance sensor 1012 may be used to help the system 1001 determine the correct distance between the platform and a shelf being imaged. Such sensors may, for example, be laser ranging sensors. Depth sensors 1014, 1016 can perform ranging of the depth of shelves and items on the shelves as they are being imaged. Handheld sensors 1030 may be used by the user to scan particular items or areas that need further attention or are being imaged incorrectly. A display 1020 may provide the user 1050 with information about the scanning and imaging being performed, including progress updates, graphical information, alerts, errors, and the like. The platform may be adjustable in height to accommodate a number of shelving arrangements. Data that is received from the numerous sensors may be processed onboard, as discussed relative to the examples above. Processed information may be wirelessly uploaded to a cloud database 1060 for further processing and distribution to other terminals connected to the system.

In one example, the sensors 1010 may be RFID scanners capable of detecting RFID devices located within items on the shelves. The computer 1008 may use simultaneous location and mapping (SLAM) techniques in conjunction with the RFID tag data to know in real-time its exact location within the environment. This information may be leveraged by the system 1001 along with other data such as the signal strength of the RFID tags detected to calculate the exact position of the tag in the environment. As the platform is driven around, it may pick up all of the RFID tags and accurately track its location and movement over time. In order to increase accuracy, the system may rapidly cycle through all of the antennas, turning them on and off in succession. This greatly improves reading accuracy by filtering out signal reflections from other antennas. In one example, the RFID sensors may be mounted on a supporting pole to allow them to read RFID signals regardless of an RFID tag's vertical height in the aisle. In another example, the supporting pole may be detachable or retractable to allow the sensors to reach difficult areas.

Information received by the RFID sensors may be analyzed using machine learning or any combination of the other data analysis techniques discussed herein. For example, machine learning techniques may allow the robot computer 40 or other computers within the system to detect patterns, identify shapes corresponding to product configurations, predict item counts and orientations, and the like. RFID data may be combined with other data to form a multi-layer understanding of the placement and location of inventory items, i.e., using visual data to understand inventory arrangements, using RFID data to understand ranging and location. Machine learning techniques are discussed in greater detail below. Machine learning processing may be applied through any one or more of the computers within the system as discussed below.

Figure 11:
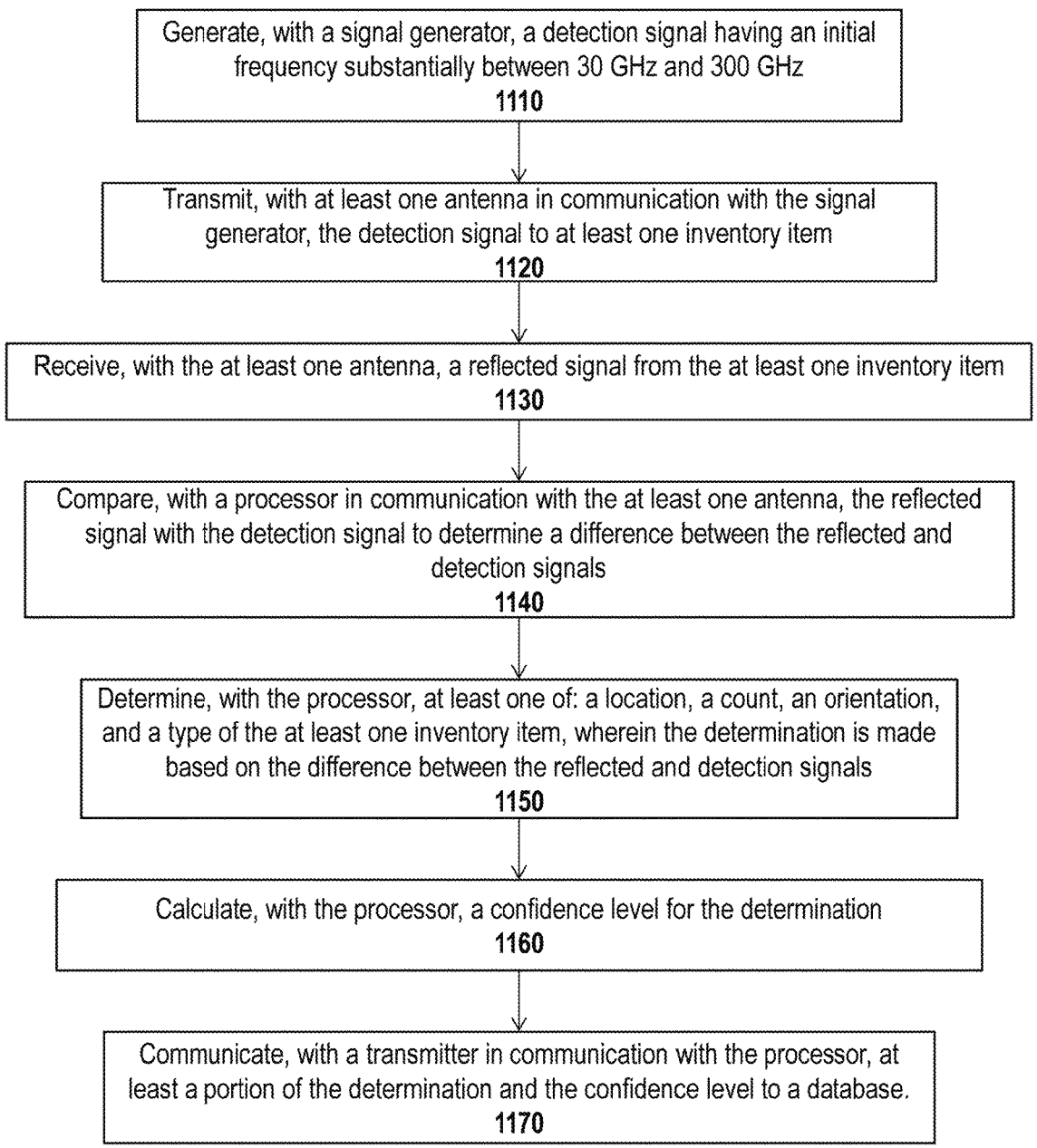
FIG. 11 is a flow chart showing a method of inventorying at least a portion of a quantity of inventory items in a commercial facility with an electronic inventory apparatus, in accordance with a second embodiment of the disclosure.

FIG. 11 is a flow chart 1100 showing a method of inventorying at least a portion of a quantity of inventory items in a commercial facility with an electronic inventory apparatus, in accordance with a second embodiment of the disclosure. The method may be performed with the apparatus 1 of FIG. 1 and any of the exemplary embodiments of FIG. 2, or it may be performed using other suitable hardware and software components. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 1110 includes generating, with a signal generator, a detection signal having an initial frequency substantially between 30 GHz and 300 GHz.

Step 1120 includes transmitting, with at least one antenna in communication with the signal generator, the detection signal to at least one inventory item.

Step 1130 includes receiving, with the at least one antenna, a reflected signal from the at least one inventory item. As discussed above, the transmitting and receiving antennas may be the same antenna alternating between transmit and receive functions, or separate antennas dedicated specifically to a transmit or a receive function.

Step 1140 includes comparing, with a processor in communication with the at least one antenna, the reflected signal with the detection signal to determine a difference between the reflected and detection signals. In one example, after performing this step, the reflected and detected signals may be stored on computer-readable memory. In another example, the difference determination may be stored.

Step 1150 includes determining, with the processor, at least one of: a location, a count, an orientation, and a type of the at least one inventory item, wherein the determination is based on the difference between the reflected and detection signals. In one example, after performing this step, the determination may be stored on computer-readable memory. In another example, Step 1150 may include the steps of learning determination rules from a set of "training" reflected millimeter wave signals (hereinafter, "training signals") stored on computer-readable memory, and applying at least one determination rule to the received reflected millimeter wave signal to make the determination. Alternatively, the training signals may be received by the transmitter and used to train the processor. This is described further in FIG. 12, below.

Step 1160 includes calculating, with the processor, a confidence level for the determination. The process of calculating a confidence level is described further in FIG. 13, below.

Step 1170 includes communicating, with a transmitter in communication with the processor, at least a portion of the determination and the confidence level to a database. The database may be a cloud database, local network, or other computer storage.

The method of inventorying a commercial facility may be repeated several times, in full or in part, to inventory the desired portion of the commercial facility. This may depend on multiple factors, for instance, the field of view and resolution of the apparatus or scanning device, the size of the facility, the nature of the items being inventoried, and the like. A user may initiate scans at several points throughout the facility. For example, a user using a handheld embodiment as in FIG. 9 may scan a single shelf using steps

1110-1160, repeat those steps on the next shelf, and continue repeating steps 1110-1160 until a full aisle has been scanned. The user may then perform step 1170 to communicate the determination and confidence level to the database. In another example, the fixed embodiment of FIG. 7A capable of rotating 360° may have a larger field of view (FOV), and may only perform steps 1110-1160 a few times as it scans an entire aisle. Or the fixed embodiment may perform the steps many times more in order to receive more granular results. In another example, the robotic embodiment of FIG. 1 may perform the entire method hundreds of times as it travels along aisles of shelves in the commercial facility, receiving constant feedback about the quality of its calculations.

The location and frequency of scans may be determined by the user. For example, the user may adjust settings on the apparatus or scanning device to perform scans in a desired manner. The user may adjust the frequency of the signal, FOV of the sensor, sensitivity, and the like. The location and frequency of scans may alternatively be determined by the processor. Based on the system limitations—FOV, angular resolution, processing speed, memory read/write speeds, etc.—the processor may instruct the user to perform more or fewer scans in certain parts of the facility or when detecting certain inventory items. The processor may use location detection to establish waypoints where scans must be performed.

In one example, the apparatus or scanning device may perform several scans in rapid succession in order to stack the processed signals or perform superresolution processing. In stacking, multiple processed signals captured from the same location may be overlaid and further processed to reduce noise and increase signal contrast. In superresolution, multiple reflected signals may be received as the receiver moves slightly or with multiple receivers slightly offset from each other, creating small shifts in the temporal or spatial characteristics of the reflected signals. The combined processed signals may resolve finer details than individual signals alone. Stacking or superresolution imaging may be chosen by either the user or the processor, depending on the intended inventory items or use conditions.

Figure 12:
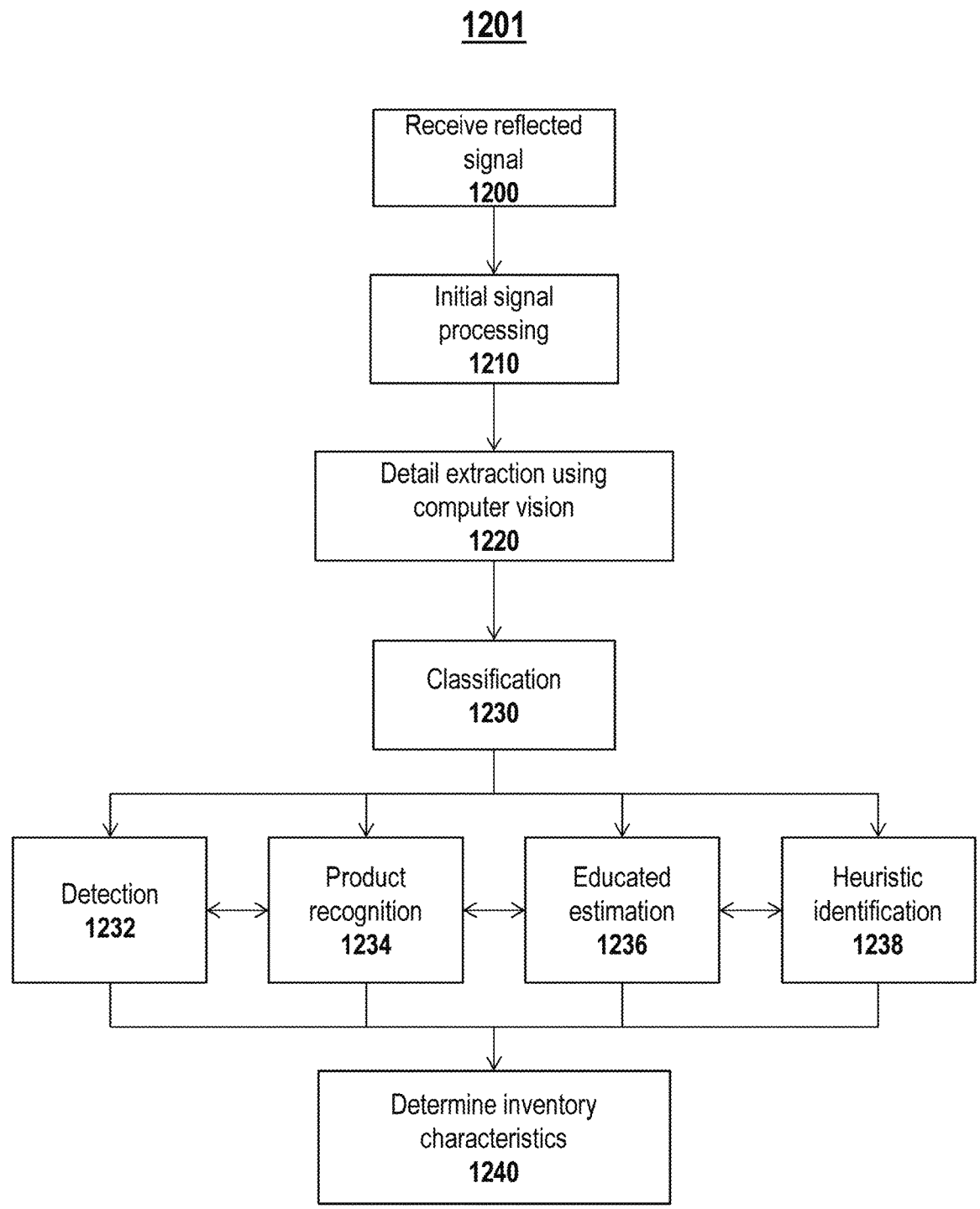
FIG. 12 is a flow chart showing an exemplary process for determining the inventory characteristics of at least one inventory item, in accordance with the second embodiment of the disclosure.

FIG. 12 is a flow chart 1201 showing an exemplary process for determining the inventory characteristics of at least one inventory item, in accordance with a second embodiment of the disclosure. The process will be discussed relative to FIGS. 1-4.

Step 1200 includes receiving one or more reflected signals. The reflected signals may include continuous or discrete chirps initially transmitted by the transmitter.

Step 1210 includes initial signal processing. The transmitted and reflected signals are directed to the processor. In one example, they may be combined by the mixer, which may perform basic signal processing operations such as adding, subtracting, time-shifting, and the like, as discussed above. These operations may reduce noise or otherwise prepare the signals, alone or combined, for processing. In another example, the signals may pass through an analog-to-digital converter (ADC) to prepare them to be read by the processor. The processor may perform some initial syncing operations as well. Any other signal processing techniques commonly known in the art may be performed during this step.

Step 1220 includes extracting details using computer vision. Computer vision may include the use of signal thresholding and contour detection to determine where discrete inventory items are located or how they are oriented. Additional signal processing operators, such as Scharr operators resulting from an optimization minimizing a weighted mean squared angular error in the Fourier domain, may be used to detect inventory item edges. Regions with contrasting mean gradients may be identified. High frequency noise may be smoothed from the gradient signal image plane. Morphological operators may be applied on the thresholded signal. This step may focus on processing only portions of the total FOV that are helpful for detecting and differentiating inventory items.

Step 1230 includes using a classification approach to assist in inventory characteristic detection. Generally, this kind of image processing uses a set of signals to train the processor 30 to detect stock items, orientation, count, and location. The processor 30 may be given signals indicative of certain items, certain arrangements of items, items in stock, items out of stock, and similar variations. The processor may use these training signals to learn the characteristic qualities of the item or the level of stock. With each subsequent viewing, the processor learns more about the characteristic qualities. The training data may be stored in on-board memory, transmitted from the database, or developed from previous scans run by the apparatus. Some combination of all training data may be used to develop robust detection rules for the processor.

The processor 30 may initially train by applying machine learning techniques to a set of training signals. The training signals may show generic signal examples, and the processor may learn to recognize inventory characteristics based on relationships between like signal sets. The training signals may be customized for certain conditions in a particular facility, which may help the apparatus 1 learn more efficiently.

The classification approach may use the training signals to build classifiers that help it recognize items. Classifiers may be managed at different hierarchical levels to detect stock and recognize products. For instance, classifier levels may include, but are not limited to: data from all stores, data from a single store, data from a single department across all stores, data in a single department in a single store, data for a particular product category across all stores, and data for a particular product category in a single store. After the classifiers are built, they may be improved using captured image data or data from previous results.

Steps 1232, 1234, 1236, and 1238 show other approaches that may be used in detecting inventory items and determining inventory characteristics. In step 1232, a detection approach may be used to identify whether any items are out of stock by considering, without considering every single detected inventory item, whether there appear to be any items out of stock. The detection approach uses the received signals as a whole to train a classifier which determines the location of an item and whether any stock is missing. In step 1234, a product recognition approach may use unique signal characteristics to create product categories. For example, if a particular inventory item always returns a reflected signal with a particular amplitude modulation or a unique peak frequency, the processor may use this to create a category for that item. Product categories can assist in building classifiers using neural network, machine learning, or deep learning techniques. In step 1236, an educated estimation approach may compare processed signals from previous inventory scans to the current inventory scans in order to determine how much stock remains. In step 1238, a heuristic identification process may be used to identify an item by the details extracted from the computer vision process 1220. The heuristic process compares previous signals captured under similar conditions, such as location in the facility or distance from the item, to the current signals, comparing detected features and other data.

It is noted that the processes described herein may be used with multiple signal images compiled together, so-called "image stitching". Image stitching may be implemented to account for the regions of an image that are close to the borders of the FOV, in order to increase the usable area of a signal scan. For instance, if an item is located between the opposite borders of two adjacent scans, for instance, between the left border of one scan and the right border of the next scan, the processor may stitch the images together and extract the inventory information from the combined signal image.

As shown in box 1240, these processes can be used to determine inventory characteristics for detected inventory items. The processor may use one or more of the classification processes, in conjunction with the computer vision and other signal processing operations, to discover pieces of inventory characteristics or patterns during the scan. The processor 30 may combine the pieces or patterns, giving some pieces more weight, to determine the desired inventory characteristics.

For example, using the locations of detected edges and contours, the processor 30 may determine where items are located on a shelf or in an aisle. Additionally, the processor 30 may use the locations of detected edges and contours to determine orientation by associating certain edge or contour patterns with certain orientations.

In another example, the apparatus 1 can determine stock quantity data using additional imaging sensors, such as visual cameras, radar, sonar, or LIDAR sensors in combination with processing already described. This may be useful in helping the processor identify items that are difficult to distinguish using millimeter waves, such as items that have substantially similar shapes. In yet another example, the apparatus may use multiple sensors in sequence to improve captured data. For instance, the apparatus may be equipped with millimeter wave and image sensors, with one sensor configured to scan first. Based on the results of the first scan, the other sensor may focus in on particular areas for increased resolving power, noise removal, or other analysis.

Figure 13:
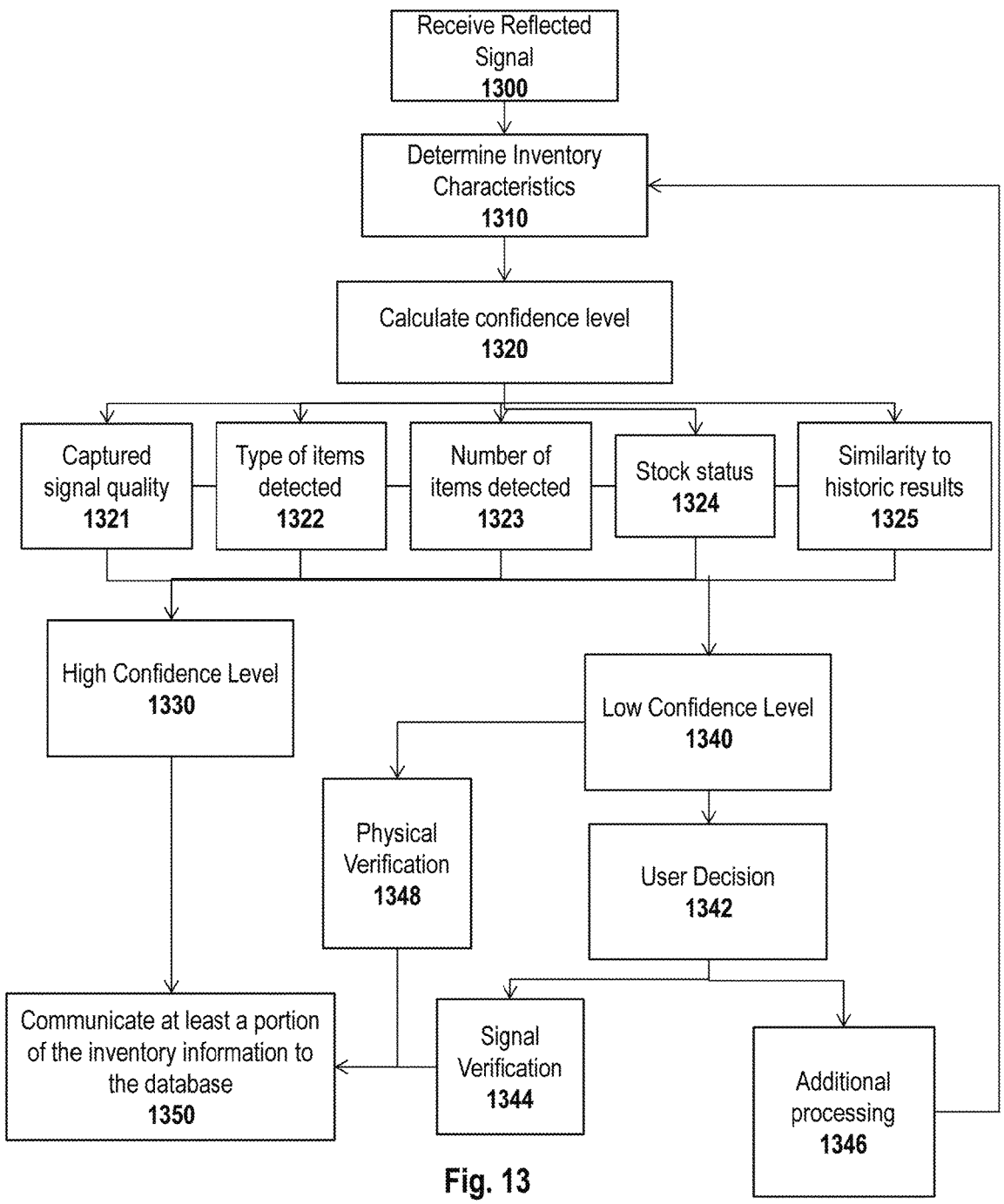
FIG. 13 is a flow chart showing an exemplary process for determining a confidence level for the inventory information using the method of FIG. 3

FIG. 13 is a flow chart 1301 showing an exemplary process for determining a confidence level for the inventory information using the apparatus of FIG. 1. The confidence level indicates how accurate the processor 30 believes the determined inventory characteristics to be.

In step 1300, the apparatus receives a reflected signal. In step 1310, the apparatus 1 determines any desired inventory characteristics. In step 1320, the apparatus calculates a confidence level for the determination. The confidence level may be determined by a number of factors, as shown in steps 1321-1325, including captured signal quality, the type of items detected, the number of items detected, the stock status of the items, and similarity to historic results, respectively. Other factors known to those of skill in the art may be considered. In one example, the processor may assign a higher confidence level for signals received with optimal noise levels, or signals clearly indicating one or more inventory items. The processor may assign a lower confidence level for noisy or incomplete signals, or where items are located too close together to distinguish. Similarly, the processor may assign a higher confidence level for images where the type and number of products can be accurately determined, while assigning a lower confidence level where the processor cannot make a determination. For example, where the detected inventory items have unique characteristics, the confidence level may be higher. Further, the processor may assign a higher confidence level where the determined inventory characteristics are similar to historically determined inventory characteristics, but assign a lower confidence level where the determined inventory characteristics vary in a statistically significant way. In one example, the processor may use some combination of these factors in determining the confidence level. Some factors may be considered more or less heavily, i.e., given weights, depending on the presence and extent of the factors.

In step 1330, inventory characteristics with a confidence level above a threshold may be communicated to the database, as shown in box 1350. This information may automatically be entered. This threshold may be the same for all items in a commercial facility, or it may differ from item to item. For example, an extremely high confidence level may be desired for expensive, high margin items, or items prone to theft. A lower confidence level may be acceptable for less expensive or low margin items, as there may be too great a trade-off between accuracy and the effort required for accuracy. Threshold confidence levels may be determined by the processor, the database, facility owners, or other software. Threshold confidence levels may be changed on occasion, for example, seasonally.

In step 1340, inventory characteristics with a confidence level below a threshold may not be automatically entered by the database. In step 1342, inventory characteristic determinations with a confidence level below a threshold may be passed to a user for additional analysis or confirmation of results. The user may use signals from other sensors, if present, to manually verify inventory location, count, orientation, or type, as shown in box 1344. The user may then direct the database to enter the inventory characteristics, as shown in step 1350. Alternatively, as shown in step 1346, the user may send the signal back to the apparatus for additional processing and further communication to the inventory database. In one example, inventory characteristics with a confidence level below a threshold may require the apparatus to capture additional signal data for the subject inventory items. The apparatus may perform another scan of the relevant area. The subsequent signals may be processed and compared with the original signals for confirmation of results. As shown in step 1348, inventory characteristics with a confidence level below a threshold may also require the user to physically verify the results. The user may check the inventory status and report it to the database, which may compare the inventory status with the original inventory characteristics and submit that to the database.

In one example, the apparatus may learn inventory characteristics from scans that resulted in low confidence levels. The processor may use these scans to understand why the confidence levels fell below a threshold and develop rules that will lead to increased confidence levels. The apparatus may learn inventory characteristics from scans confirmed by a user. The processor may develop rules to understand why the user made a particular decision. In another example, the apparatus may learn inventory characteristics from scans performed by other apparatuses within its network. To this end, the database may identify and make available scans that are particularly helpful in apparatus learning.

In another example, the database may include an analytics system, e-commerce system, or other end-user systems for processing and utilizing the scanned inventory characteristics.

The analytics system may provide detailed analysis of inventory information for human end users. Planogram analytics may be used to analyze inventory layout plans for improvements. Inventory analytics may be used to analyze ordering patterns for effectiveness. Pricing analytics may be used to compare the prices of available inventory to competitors. Response analytics can be used to analyze a facility's response to low inventory events, theft, and discrepancies.

The e-commerce system may provide a platform for internet sales of items located within the facility. The database may maintain inventory and location data for every item in a commercial facility, or across multiple facilities. E-commerce customers seeking to purchase items may interact with the database, which may search for in-stock items and provide location data to customers.

A theft tracking system may allow a facility to track every item in the facility in real time. For example, the facility may be constantly scanned by several apparatuses placed to provide full coverage of the facility. As items are moved throughout the facility, an apparatus may detect the motion and track the item's location. The apparatus may report this to a theft tracking system on the database, which coordinates the other apparatuses to track the item as well. At an appropriate point, loss prevention teams may be alerted to investigate items that are moving suspiciously.

Database systems may be accessed using a graphical interface through a software application or a website. The interface may work with a virtual model of the shelves and aisles in facility, such as a "master-shelf" model which maintains a virtual representation of all of the inventory information communicated to the database. The virtual model may not be a visual representation, but may be primarily a numerical representation of the inventory. The virtual model may be updated each time the apparatus communicates new information to the database.

Figure 14:
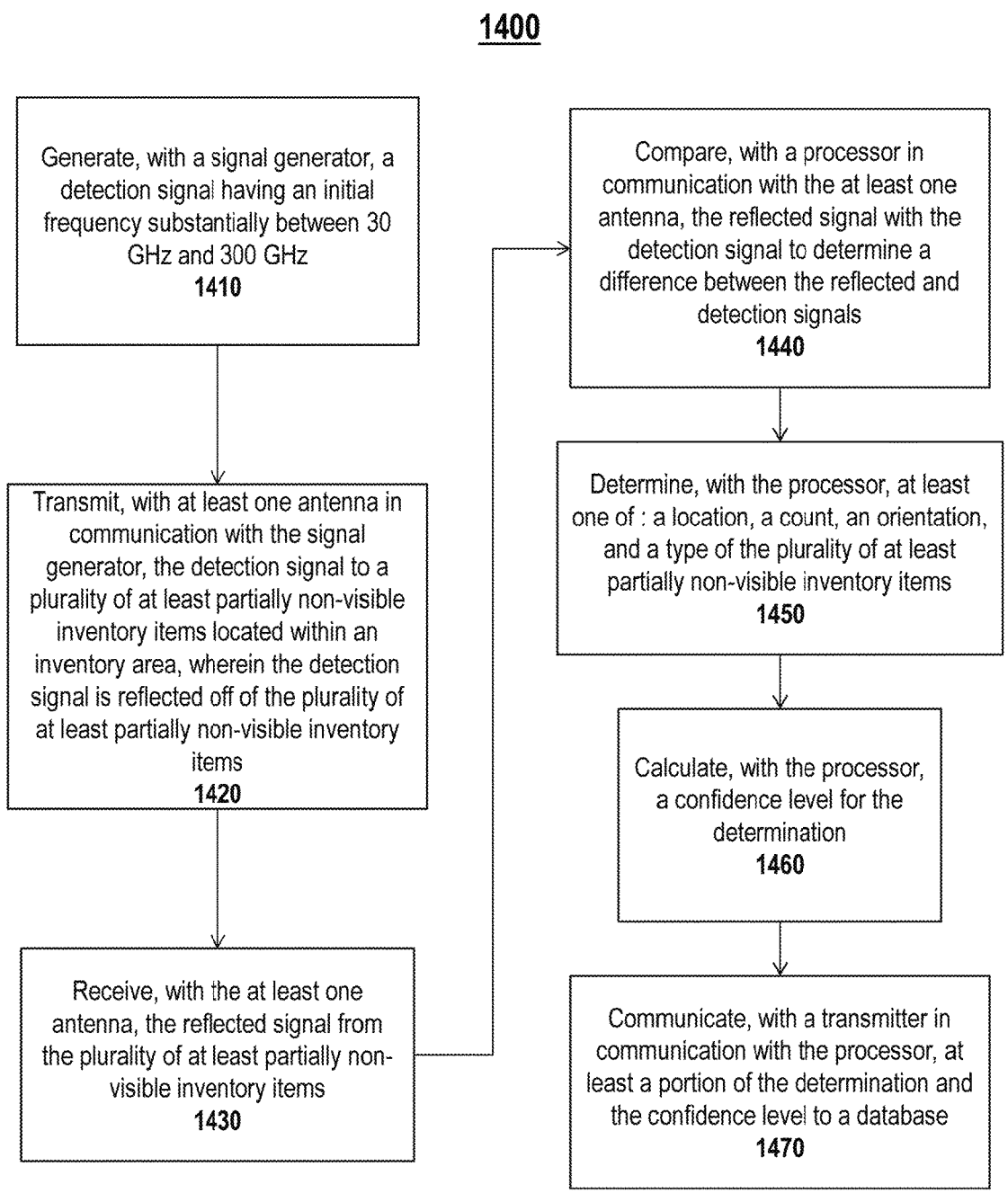
FIG. 14 is a flow chart showing a method of inventorying at least partially non-visible items, in accordance with a third embodiment of the disclosure.

FIG. 14 is a flow chart 1400 showing a method of inventorying at least partially non-visible items, in accordance with a third embodiment of the disclosure. The method may be performed with the apparatus of FIG. 1 and any of the additional exemplary embodiments or it may be performed using other suitable hardware and software components.

Step 1410 includes generating a detection signal. The detection signal has an initial frequency substantially between 30 GHz and 300 GHz and is a millimeter wave signal.

Step 1420 includes transmitting the detection signal to a plurality of at least partially non-visible inventory items located within an inventory area, wherein the detection signal is reflected off of the plurality of at least partially non-visible inventory items. The detection signal is transmitted using at least one suitable antenna in communication with the signal generator.

Non-visible inventory items may be any inventory items described above which are visually obscured or difficult to see. For instance, non-visible inventory items may be products located in product packaging, shipping packaging, delivery vehicles, and the like. Such inventory items may not be visible to the human eye, as packaging materials generally obscure them. However, millimeter waves may be able to propagate through packing materials and reflect off of the inventory items. Non-visible inventory items may additionally be items obscured by their placement, for example, items located on high or dark shelving. Millimeter waves may propagate through shelving. Non-visible inventory items may additionally be items commonly grouped closely together, such as screws and other hardware. It may be difficult for humans to visually count such items, but millimeter waves may be able to resolve them. At least partially non-visible inventory items are those items that are partially or completely obscured for any of the above reasons.

An inventory area may be any area, whether within a facility or other location, in which non-visible inventory items are located. For example, this may be a shipping box, pallet, shelf, aisle, or display. This may also be a shopping cart, shopping bag, storage container, and the like.

Step 1430 includes receiving the reflected signal from the plurality of at least partially non-visible inventory items. The reflected signal may be received with any number of suitable antennas.

Step 1440 includes comparing, with a processor in communication with the at least one antenna, the reflected signal with the detection signal to determine a difference between the reflected and detection signals.

Step 1450 includes determining, with the processor, at least one of: a location, a count, an orientation, and a type of the plurality of at least partially non-visible inventory items.

Step 1460 includes calculating, with the processor, a confidence level for the determination.

Step 1470 includes communicating at least a portion of the determination and the confidence level to a database. A transmitter in communication with the processor may transmit the determination and the confidence level.

Figure 15:
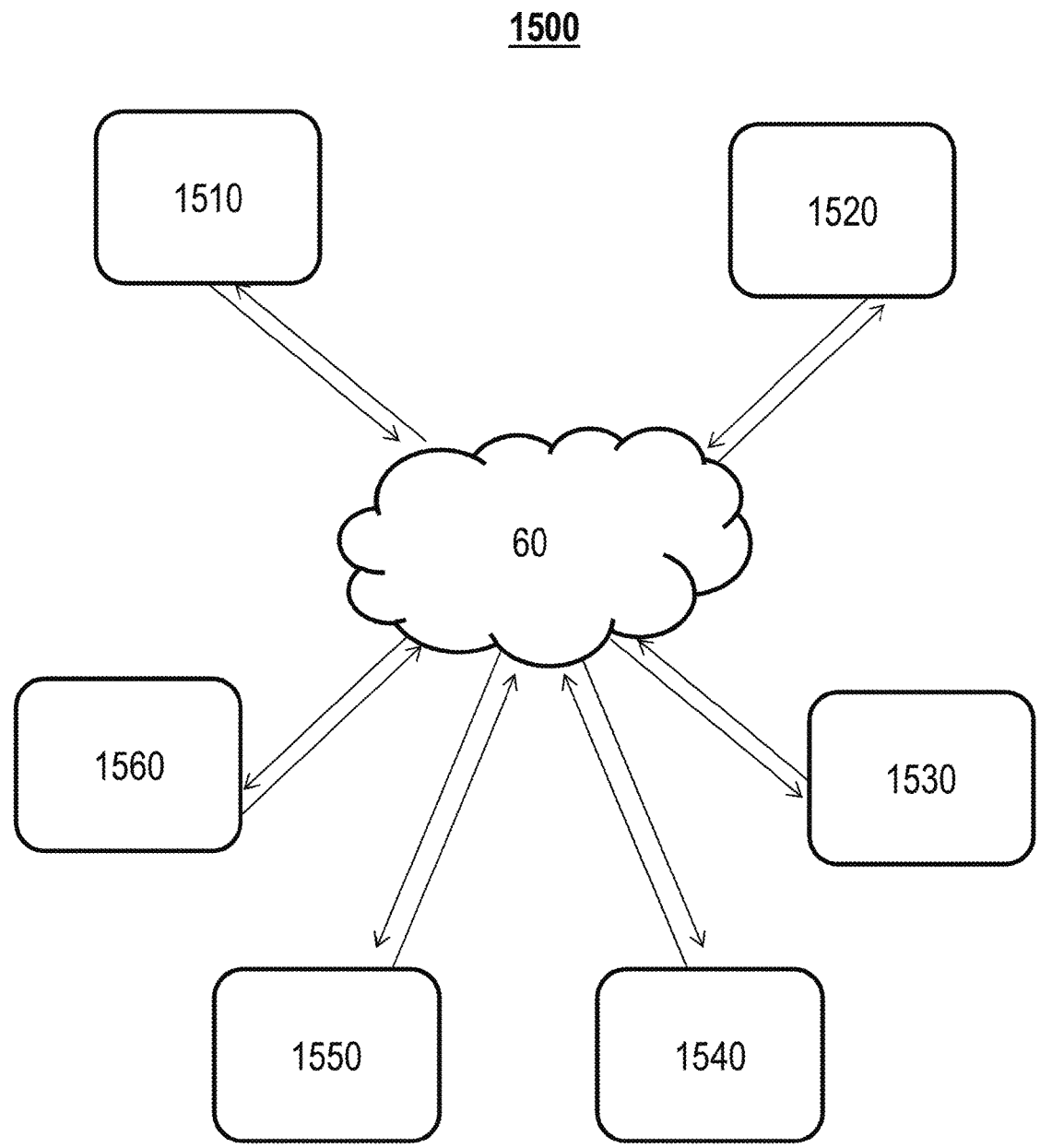
FIG. 15 is a flow chart showing the central data hub in communication with hardware devices of the system for performing inventory management within a commercial facility.

FIG. 15 is a flow chart 1500 showing the central data hub 60 in communication with hardware devices 1510, 1520, 1530, 1540, 1550, 1560 of the system for performing inventory management within a commercial facility. Hardware device 1510 may be a computer system or terminal at a retailer's warehouse. Exemplary information exchanged between the device 1510 and the hub 60 may include data collection to the hub 60 and refill/order information to the device 1510. Hardware device 1520 may be a computer system or terminal at a retailer store. Information from the hub 60 to the store may include online orders, supplier delivery information, transit information, and the like, while information from the device 1520 may include sales data, inventory information, and refill orders. Device 1530 may be a computer system or terminal for customer executives. Information between the hub 60 and the device 1530 may include sales predictions from the hub 60 and administrative plans from the customer executive device 1530. Device 1540 may be a computer system or terminal at a retail supplier's location. Information exchanged between the hub 60 and the device 1540 may include refill demand information from the hub and delivery information from the retailer supplier device 1540. Device 1550 may be a computer system or terminal for other third party agencies, such as strategic partners, social media groups, and the like. Information exchanged between the hub 60 and the device 1550 may include targeting information from the hub 60 and weather and special event information from the third party agency device 1550. Device 1560 may be a computer system or terminal for retail or individual customers. Information exchanged between the hub 60 and the device 1560 may include product and retail location recommendations from the hub 60 and transaction and order data from the customer device 1560. The devices may communicate with one another through the hub 60, either directly or indirectly. One device may send a request for information that may be passed to one or more other devices connected to the hub 60. The system of devices and the hub may work together to provide all of the respective users and producers with holistic information about the product supply and sales chains.

The terminals or devices 1510-1560 act as interfaces between the various users and the hub 60, presenting insights obtained by analyzing the tremendous amounts of data collected across the network and allowing for the collection of important user input and relaying of user actions. For customer executives and middle management, the device-hub connection presents the overall business insights and allows for the sharing of internal discussions. For district managers, the device-hub connection shares the key performances indicator information, including district performance with store data, and connects district managers to regional and store managers in nearby areas. For store managers, the device-hub connection displays key performance indicators for the store, real-time inventory information, options for ordering/stock refill, and provides connections between nearby managers and superiors. For store associates, the device-hub connection may provide goals for the day, week, or month, tasks to perform, tasks accomplished, real-time inventory data, and tasking/messaging within the store. For affiliated vendors and third parties, the device-hub connection may provide demand and supply information, historical data analysis, product stocking information for a particular location, supply ordering, and supplier information and communication.

In one example, the central data hub 60 may be a central data hub that serves as an information processing center. The information from all input sources over the retail network may be fed through the cloud, categorized, analyzed, processed in other ways, and redistributed back to the appropriate entities within the network. The processing and analysis may be primarily performed by automated computer algorithms, discussed in greater detail below, with occasional manual adjustment where needed. The central data hub 60 may also aggregate and learn from external data sources, such as social media, publicly-available data, and the like. In one example, the central data hub 60 may surface data insights that it finds are probabilistically most actionable to users. It may also distribute and update the more intelligent components of its network with the additional training it has gathered from the stream of aggregated information across the network, such that they can be taken advantage of locally by those devices.

The data hub 60 may collect, process, and communicate information using social media. Social media may allow the system to provide targeted marketing to users or customer groups. For instance, a user can choose to receive marketing information in real-time or on a fixed schedule, and can set a preference on marketing content, such as discounts or offers on products liked on Facebook® and the like. Social media may allow marketing based on a user's location, particularly when a customer is marked as checked into a competitor's store and can be offered a discount. Marketing may be event based, for instance, if a user posts about an upcoming vacation, birthday, anniversary, loss of family member, and the like. The data hub 60 may also analyze a user's profile to determine the user's economic condition (employed, wealthy), personal condition (married, social) and other details. The data hub 60 may also be able to use social media to foresee product demand or supply issues due to events such as holidays, celebrations, natural disasters, and the like. The hub 60 can direct more or fewer supplies to areas with higher need or diminished capacity, or send alerts to drivers, inventory people, and managers in those areas.

The graphical and user interface elements of the central data hub 60 are discussed in further detail below.

Figure 16:
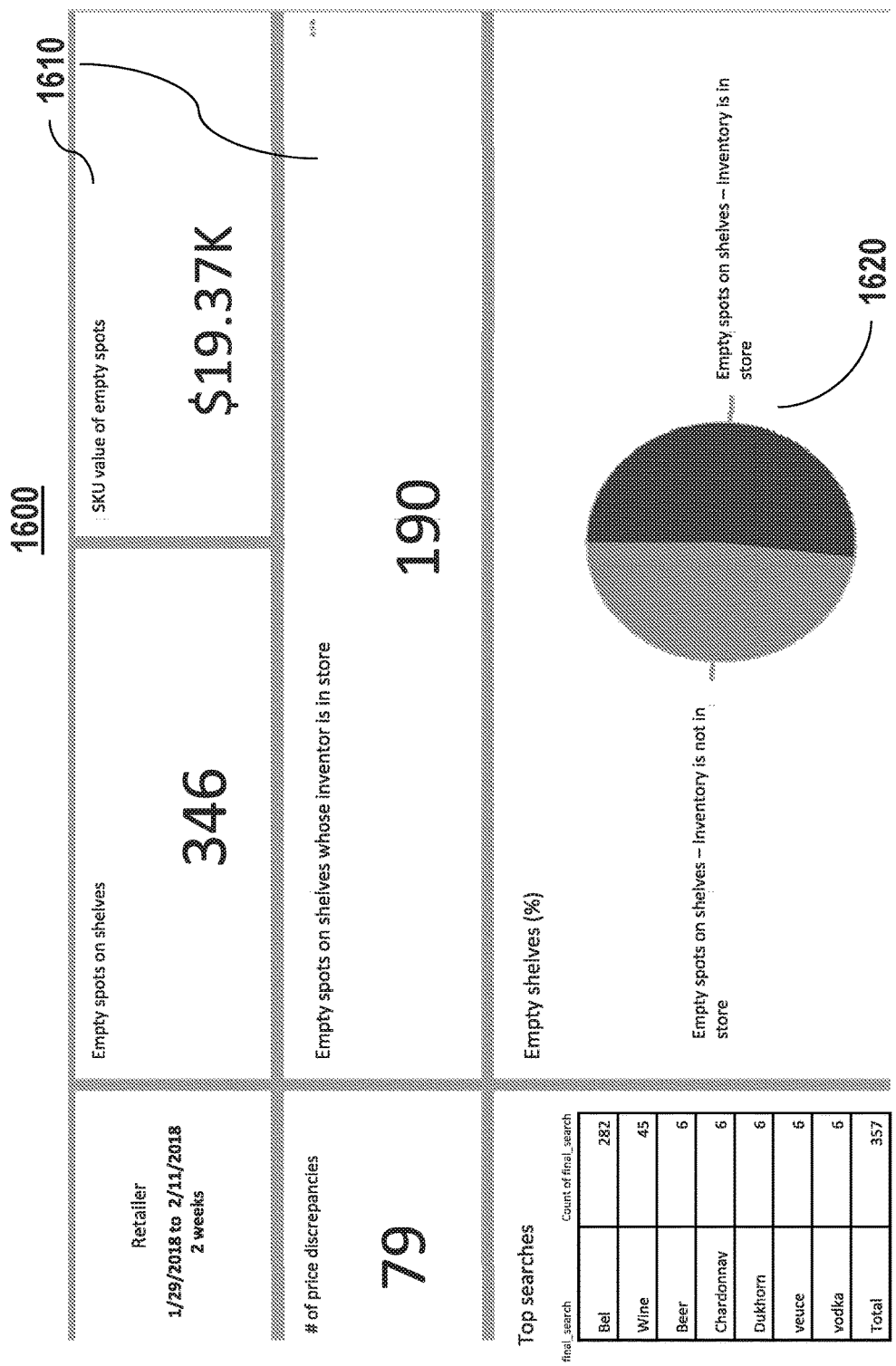
FIG. 16 is an illustration of the product manager dashboard interface of the system.

FIG. 16 is an illustration of the product manager dashboard 1600 interface of the system. The product manager dashboard 1600 may be a portion of the interface available for use by customer executives and product managers using a device 1530 connected to the hub 60 shown in FIG. 15. The dashboard 1600 may contain informational boxes corresponding to high level product information across a number of retail or other environments. Text boxes 1610 may contain textual and numeric data, for example, the number of empty spots on shelves, the value of those empty spots, the number of empty spots where inventory can be restocked from store stock, and the number of price discrepancies, among others. Graphical boxes 1620 may present information in a visual or graphical format, such as charts corresponding to the ratio of empty spots on shelves for stores having inventory vs. not having inventory.

The information offered in the dashboard 1600 may help executives and product managers understand their products in a number of areas. For instance, they may allow managers to understand the percentage of inventory in the store but not on the shelf vs. inventory not in the store; understand the dollar value associated with empty spots on the shelves; understand frequently searched for or requested products in a store; understand the number of price discrepancies happening in the store or department; and provide feedback that can be passed to departments with frequent duplicate scans or error messages.

Figure 17A:
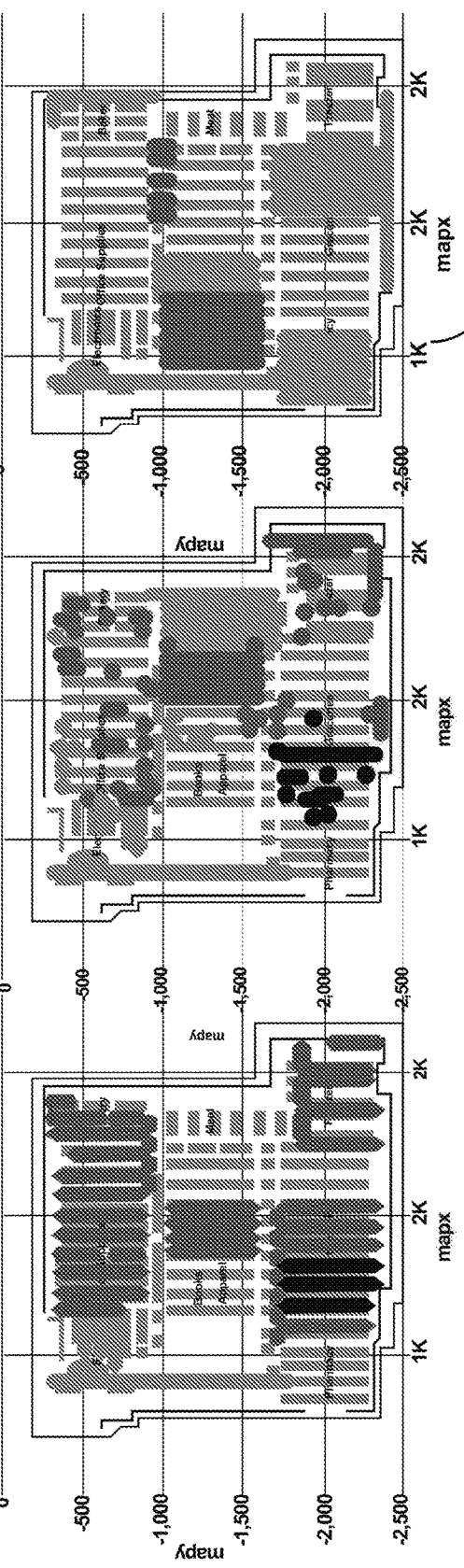

FIGS. 17A-17B are illustrations of the visual location mapping interface of the system. FIG. 17A shows a data capturing page 1700 that provides a graphical representation 1710 of data capture attempts by the robots, devices, or systems discussed in FIGS. 1-10, above. Each graphic 1710 may indicate a different capture result. For instance, one graphic may indicate portions of the store that were captured successfully, one graphic 1710 may indicate portions of the store that were not captured successfully, and one may indicate portions of the store where no attempts to capture were made. Additional menus 1720 may allow a user to refine the results by department, product, aisle, store, and the like. Using this dashboard, a product manager can monitor the data capturing status across one or more stores and filter information as needed.

FIG. 17B shows a product location page 1701 that provides a map of a store 1711 and a visual representation of a product's location within the store. Additional menus may allow a user to search for particular items, groups of items, price points, and the like. Searches may be performed by item names, SKUs, ID numbers, departments, and the like.

FIG. 18 is an illustration of the store manager dashboard interface 1800 of the system. The store manager dashboard 1800 may provide relevant data and communication capabilities for store managers and product managers/executives managing certain products. The interface may include text information boxes 1810 containing textual or numeric data. For instance, the text information boxes may include data on the number of new discrepancies in data capture, SKU values of all empty spots, and missing inventory data. Graphical information boxes 1820 may provide graphical information about the products, for instance, charts showing the percentage of empty shelves that are known vs. unknown. The data may be displayed across regions, particular stores, particular store brands, or some combination. Store managers may be granted restricted access to some information, for instance, only being allowed to see their own store. Store managers may additionally be able to inquire further about categories of information displayed and which store associates populated the data.

Figure 19:
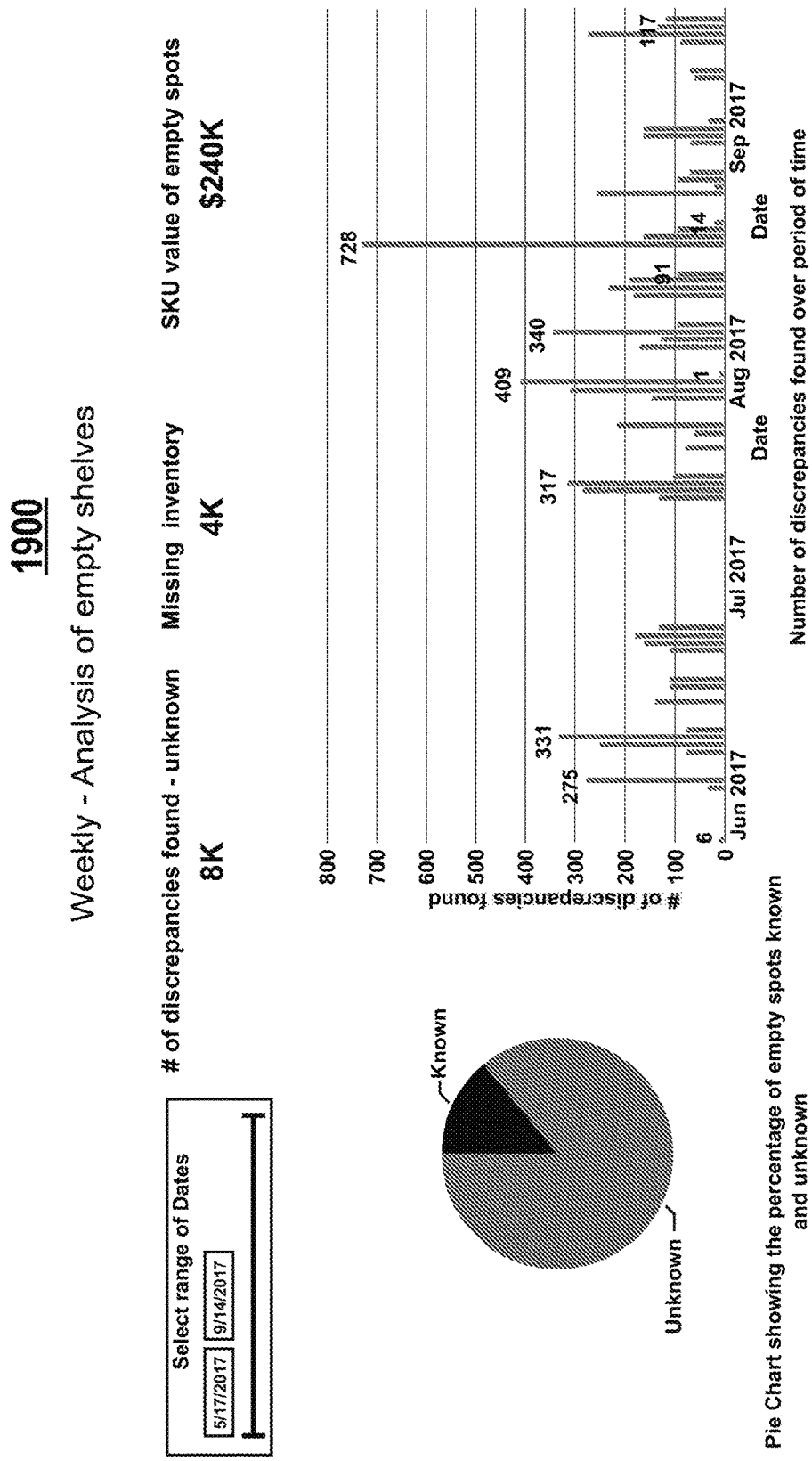
FIG. 19 is an illustration of the empty shelves interface of the system.

FIG. 19 is an illustration of the empty shelves interface 1900 of the system. The empty shelves interface 1900 may provide the store or product manager with historical data related to a product's empty shelves. The user may be allowed to select a range of dates to view data. Graphical data such as charts and graphs may show the number of times and locations where empty shelves where recorded during data capture. Textual and numeric data may indicate the number of new discrepancies, the total of missing inventory, and the SKU value of the empty spots.

FIG. 20 is an illustration of the associate performance interface 2000 of the system. The associate performance interface 2000 may provide graphical, text, and numeric data to store and product managers showing the actions of their store associates in documenting inventory data throughout a date range. The range may be selected by the user. Graphical, text, and numeric information may include a number of new discrepancies that were unknown to the store, the number of missing inventory items, the SKU value of empty spots, the number of discrepancies resolved by the associate, and the type of action taken by the associate when a discrepancy was reported. Graphs may show trends or analysis of multiple associates, allowing for productivity and work to be compared across a date range.

Figure 21:
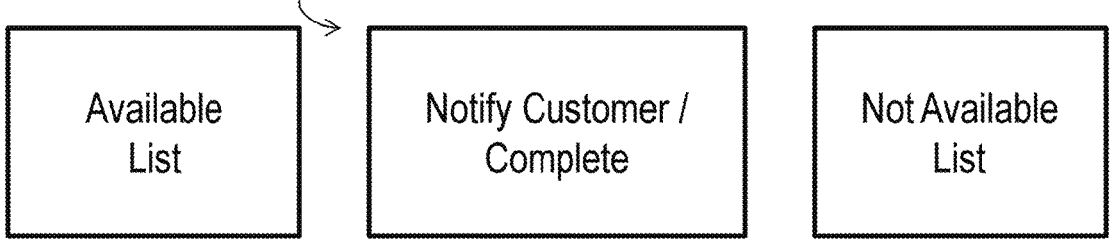
FIG. 21 is an illustration of the customer home screen interface of the system.

FIG. 21 is an illustration of the customer home screen interface 2100 of the system. The customer home screen interface 2100 may allow a store associate to view and prepare online or in-store orders from customers. The store associate may receive an order notification showing the items ordered. An order box 2110 may become available to the associate, showing details such as the item number, item location, and availability, either in-store or in other stores. The associate may also click on or interact with availability boxes 2120, which may open additional menus and lists. For instance, an availability box showing the items available in store may allow the associate to find all of those items. An availability box showing a list of the items not available in the store may allow the associate to backorder those items. And an availability box indicating that the order has been fulfilled may allow the associate to communicate to the customer that their order is ready for pickup.

Figure 22:
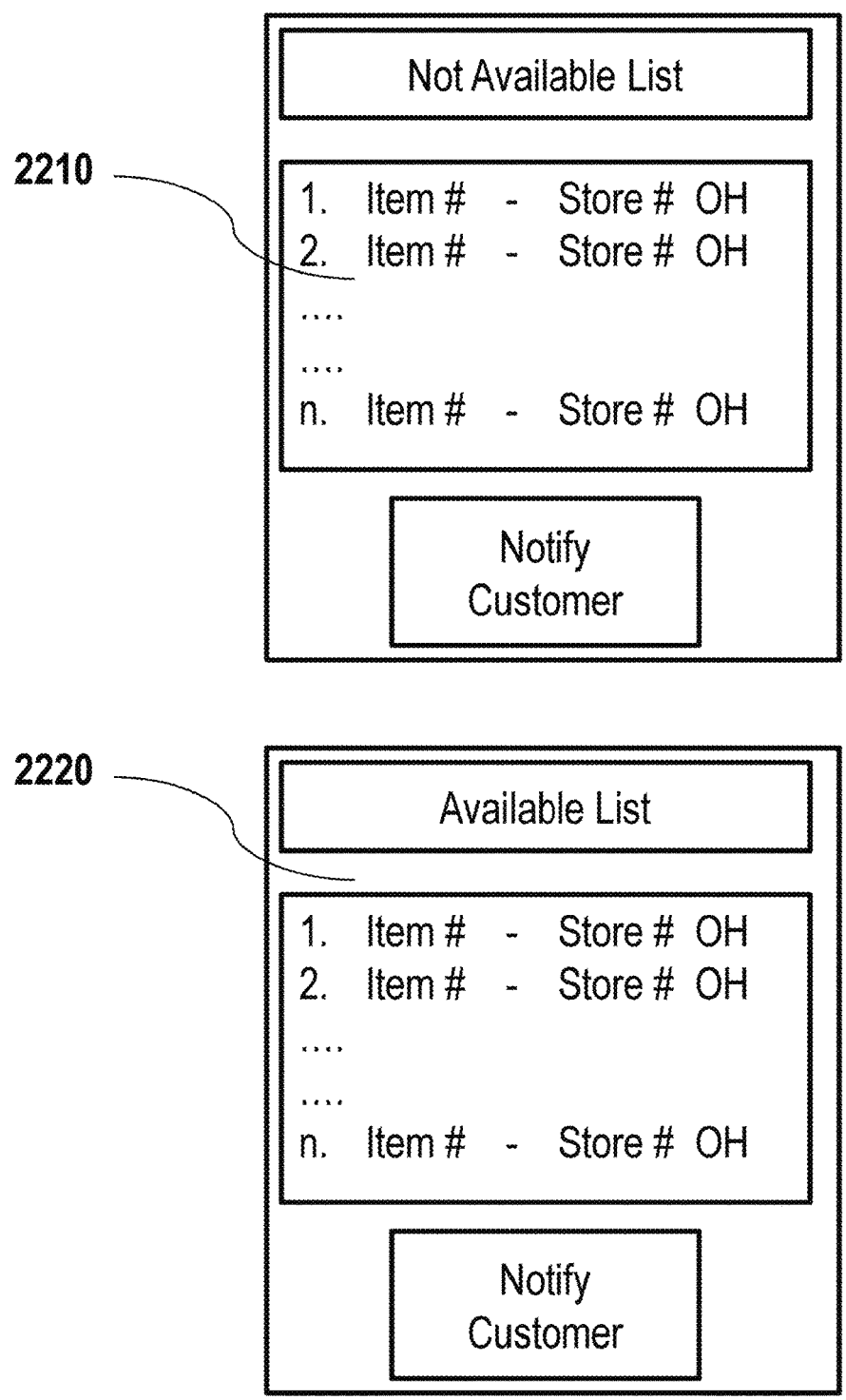
FIG. 22 is an illustration of the list view interface of the system.

FIG. 22 is an illustration of the list view interface 2200 of the system. The list view interface 2200 may show the contents of the availability boxes discussed in FIG. 21 in list form. For example, a not available list 2210 may show all of the items not available in the store, but may indicate where the items are otherwise available. An available list may indicate which items are available in the store for fulfillment. The lists may be organized for ease of use. For instance, the available list may be organized by the quickest route for fulfillment so that the associate can pick up the items in the optimal amount of time. Both lists may include buttons for notifying the customer that the items are or are not available.

Figure 23:
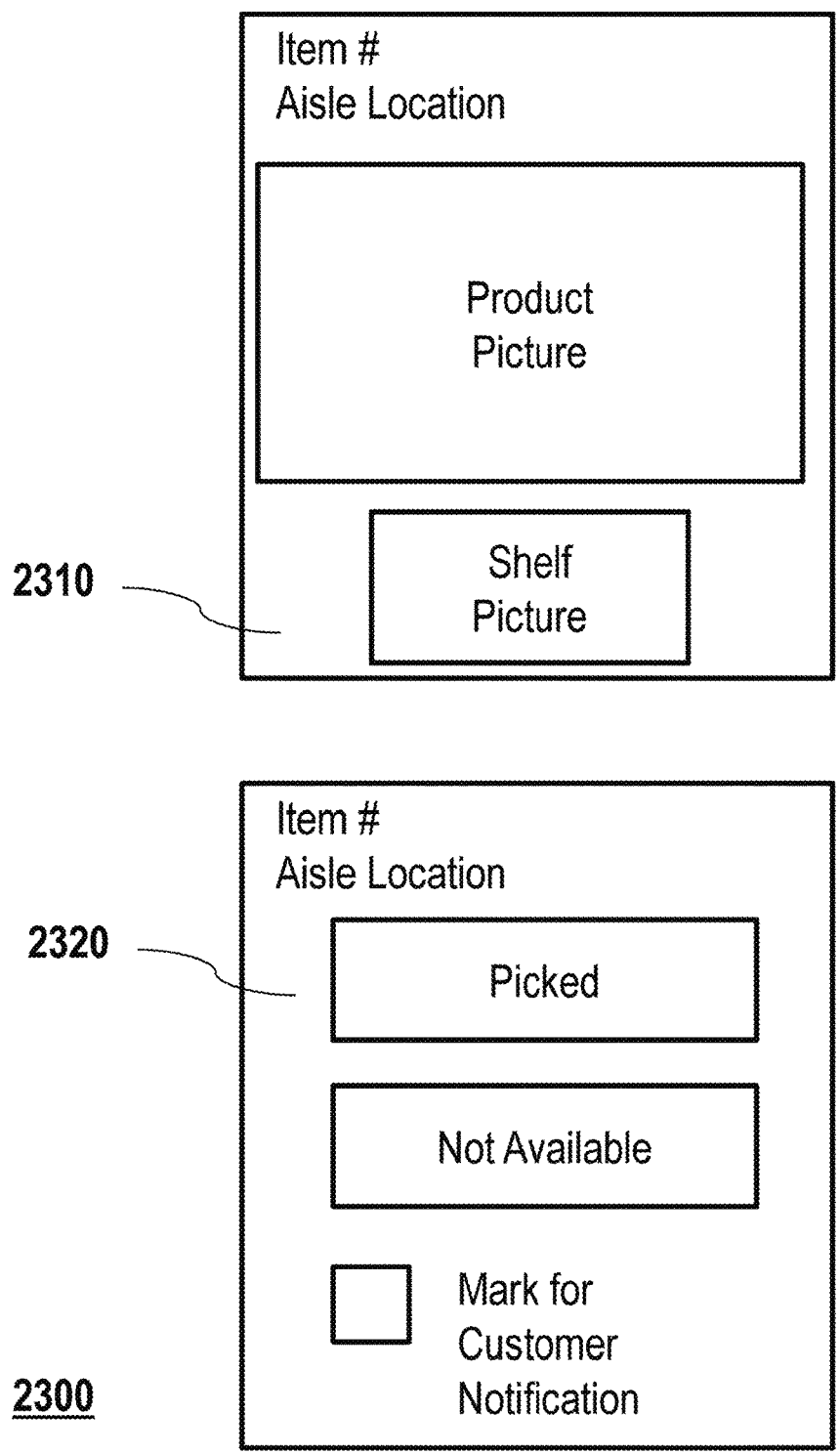
FIG. 23 is an illustration of the item screen interface of the system.

FIG. 23 is an illustration of the item screen interface 2300 of the system. The associate may interact with items on the lists in FIG. 22 to bring up the item screen interface 2300. The interface 2300 may bring up boxes 2310, 2320 including information about the product and action items to accomplish. In the product box 2310, a picture of the product, along with pictures of the shelf, may be displayed to allow the associate to easily find the correct product. In the action box 2320, the associate may be able to mark whether the item was picked or unavailable, and may decide to notify the customer. The associate may use both boxes as he or she goes through fulfilling an order in order to keep track of which items have been obtained.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure.

All such modifications and variations are intended to be included herein within the scope of the present disclosure and protected by the following claims.

What is claimed is:

1. A robot for performing inventory management within a commercial facility, comprising:
   a locomotion platform;
   at least one imaging sensor;
   a transmitter for sending inventory information to a database;
   a receiver for receiving inventory information from a database; and
   a robot computer in communication with the locomotion platform, the at least one imaging sensor, the transmitter, and the receiver, the robot computer having a processor and computer-readable memory, wherein the robot computer is configured to:
      capture inventory images from the at least one imaging sensor,
      detect inventory by comparing captured inventory images with stored inventory images,
      determine inventory information,
      determine a confidence level for the inventory information, wherein the confidence level is determined based on at least a type of inventory items detected and a number of inventory items detected, and
      communicate at least a portion of the inventory information having a confidence level above a threshold to the database.

2. The robot of claim 1, shaped as an aerial drone, wherein the locomotion platform comprises at least one set of propellers.

3. The robot of claim 1, comprising at least one visible spectrum imaging sensor and at least one non-visible spectrum imaging sensor.

4. The robot of claim 3, wherein the at least one visible spectrum imaging sensor is configured to capture inventory images, and wherein the at least one non-visible spectrum imaging sensor is configured to detect obstacles in a travel path of the robot.

5. The robot of claim 3, wherein the at least one visible spectrum imaging sensor and at least one non-visible spectrum imaging sensor are operated in sequence.

6. The process of claim 1, wherein the confidence level is determined by at least one factor selected from the group consisting of: captured image quality, stock status, and similarity to historic results.

7. A system for performing automated inventory management within a commercial facility, comprising:
   at least one imaging sensor;
   a transmitter for sending inventory information to a database;
   a receiver for receiving inventory information from a database;
   a computer in communication with the at least one imaging sensor, the transmitter, and the receiver, the computer having a processor and computer-readable memory, wherein the computer is configured to:
- capture inventory images from the at least one imaging sensor,
- detect inventory by comparing captured inventory images with stored inventory images,
- determine inventory information,
- determine a confidence level for the inventory information, wherein the confidence level is determined based on at least a type of inventory items detected and a number of inventory items detected, and
- communicate at least a portion of the inventory information having a confidence level above a threshold to the database.

8. The system of claim 7, further comprising a plurality of wheels and a handle, and wherein the system is user-drivable.

9. The system of claim 7, comprising at least one visible spectrum imaging sensor and at least one non-visible spectrum imaging sensor.

10. The robot of claim 9, wherein the at least one visible spectrum imaging sensor and at least one non-visible spectrum imaging sensor are operated in sequence.

11. The process of claim 7, wherein the confidence level is determined by at least one factor selected from the group consisting of: captured image quality, stock status, and similarity to historic results.

12. The process of claim 7, wherein the inventory information communicated to the database includes a portion of the captured inventory images at a first resolution and a portion of the captured inventory images at a second resolution, wherein the second resolution is different from the first resolution.

13. A method of inventorying a commercial facility with a robot, the method comprising:
- providing a robot within a commercial facility, wherein the robot has a locomotion platform, at least one imaging sensor, a transmitter for sending inventory information to a database, a receiver for receiving inventory information from a database, and a robot computer in communication with the locomotion platform, the at least one imaging sensor, the transmitter, and the receiver, the robot computer having a processor and computer-readable memory;
- capturing inventory images with the at least one imaging sensor;
- detecting inventory information by comparing captured inventory images with stored inventory images;
- determining a confidence level for the inventory information, wherein the confidence level is determined based on at least a type of inventory items detected and a number of inventory items detected, and
- communicating at least a portion of the inventory information having a confidence level above a threshold to the database.

14. The method of claim 13, wherein the robot computer is configured to direct the robot to at least one waypoint location within the commercial facility, and wherein the robot captures the inventory images at the at least one waypoint.

15. The method of claim 14, wherein the step of detecting inventory information includes comparing the inventory images captured at a waypoint to stored inventory images captured at the same waypoint.

16. The method of claim 13, wherein the step of detecting inventory information includes at least one from the group consisting of barcode detection, label detection, and out-of-stock detection.

17. The process of claim 13, wherein the confidence level is determined by at least one factor selected from the group consisting of: captured image quality, stock status, and similarity to historic results.

18. The process of claim 13, wherein the inventory information communicated to the database includes a portion of the captured inventory images at a first resolution and a portion of the captured inventory images at a second resolution, wherein the second resolution is different from the first resolution.

19. The process of claim 13, wherein at least a portion of the step of detecting inventory information is performed by the robot, and a portion of the step of detecting inventory information is performed by the database.

20. The process of claim 13, wherein the at least one imaging sensor further comprises at least one of a visible spectrum imaging sensor or a non-visible spectrum imaging sensor.

* * * * *